(12) United States Patent
Suzuki et al.

(10) Patent No.: US 9,320,033 B2
(45) Date of Patent: Apr. 19, 2016

(54) MOBILE STATION DEVICE, BASE STATION DEVICE, WIRELESS COMMUNICATION METHOD, AND INTEGRATED CIRCUIT

(71) Applicant: SHARP KABUSHIKI KAISHA, Osaka-shi, Osaka (JP)

(72) Inventors: Shoichi Suzuki, Osaka (JP); Daiichiro Nakashima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 51 days.

(21) Appl. No.: 14/384,961

(22) PCT Filed: Mar. 11, 2013

(86) PCT No.: PCT/JP2013/056576
§ 371 (c)(1),
(2) Date: Sep. 12, 2014

(87) PCT Pub. No.: WO2013/137164
PCT Pub. Date: Sep. 19, 2013

(65) Prior Publication Data
US 2015/0029929 A1 Jan. 29, 2015

(30) Foreign Application Priority Data
Mar. 14, 2012 (JP) ................................ 2012-056894

(51) Int. Cl.
*H04W 72/04* (2009.01)
*H04L 1/18* (2006.01)
(Continued)

(52) U.S. Cl.
CPC ........... *H04W 72/042* (2013.01); *H04L 1/1812* (2013.01); *H04L 5/0055* (2013.01);
(Continued)

(58) Field of Classification Search
CPC ............... H04W 72/0406; H04W 72/0446; H04W 4/06; H04W 76/021; H04W 76/048; H04L 1/18; H04L 1/1812; H04L 1/1861; H04L 5/0055; H04L 5/0023; H04L 5/0048; H04L 5/0091
USPC .................................................. 370/312, 329
See application file for complete search history.

(56) References Cited

U.S. PATENT DOCUMENTS 8,155,062 B2 * 4/2012 Jung ................... H04W 72/042
370/329
8,614,978 B2 * 12/2013 Che ....................... H04L 1/1635
370/328

(Continued)

OTHER PUBLICATIONS

Ericsson, "Views on Enhanced PHICH," 3GPP TSG RAN1 #67, San Francisco, USA, R1-113682, Nov. 14-18, 2011.
(Continued)

*Primary Examiner* — Afsar M Qureshi
(74) *Attorney, Agent, or Firm* — Birch, Stewart, Kolasch & Birch, LLP

(57) ABSTRACT

A mobile station device and a base station device correctly communicate using E-PHICH. The mobile station device receives information indicating a subframe to be reserved for transmitting a HARQ feedback using an enhanced physical HARQ indicator channel, transmits a transport block by using a physical uplink shared channel, and if a time in which the HARQ feedback for the transmission of the transport block is received by using the enhanced physical HARQ indicator channel is a subframe excluding the subframe indicated by the information, when the HARQ feedback for the transmission of the transport block is received, the mobile station device sets a state variable managed by a HARQ process corresponding to the transport block to acknowledgement (ACK).

4 Claims, 13 Drawing Sheets

(51) Int. Cl.
*H04W 4/06* (2009.01)
*H04L 5/00* (2006.01)

(52) U.S. Cl.
CPC .............. *H04W 4/06* (2013.01); *H04L 1/1861* (2013.01); *H04L 5/0023* (2013.01); *H04L 5/0048* (2013.01); *H04W 72/0406* (2013.01)

(56) References Cited

U.S. PATENT DOCUMENTS

| | | | | |
|---|---|---|---|---|
| 8,670,410 B2* | 3/2014 | Luo | ...................... | H04L 1/1607 370/331 |
| 2008/0285513 A1* | 11/2008 | Jung | ................... | H04W 72/042 370/329 |
| 2011/0116437 A1 | 5/2011 | Chen et al. | | |
| 2013/0064216 A1* | 3/2013 | Gao | ...................... | H04L 5/0016 370/330 |
| 2013/0201926 A1* | 8/2013 | Nam | ...................... | H04L 1/1685 370/329 |

OTHER PUBLICATIONS

Ericsson, "Way Forward on downlink Control channel enhancements by UE-specific RS," 3GPP TSG RAN1 #66bis, Zhuhai, China, R1-113589, Oct. 10-14, 2011.

Samsung, "PDSCH reception in MBSFN", 3GPP Draft; R2-113271 PDSCH in MBSFN, 3rd Generation Partnership Project (3GPP), May 3, 2011, vol. RAN WG2, No. Barcelona, Spain; May 9, 2011, XP050495417.

* cited by examiner

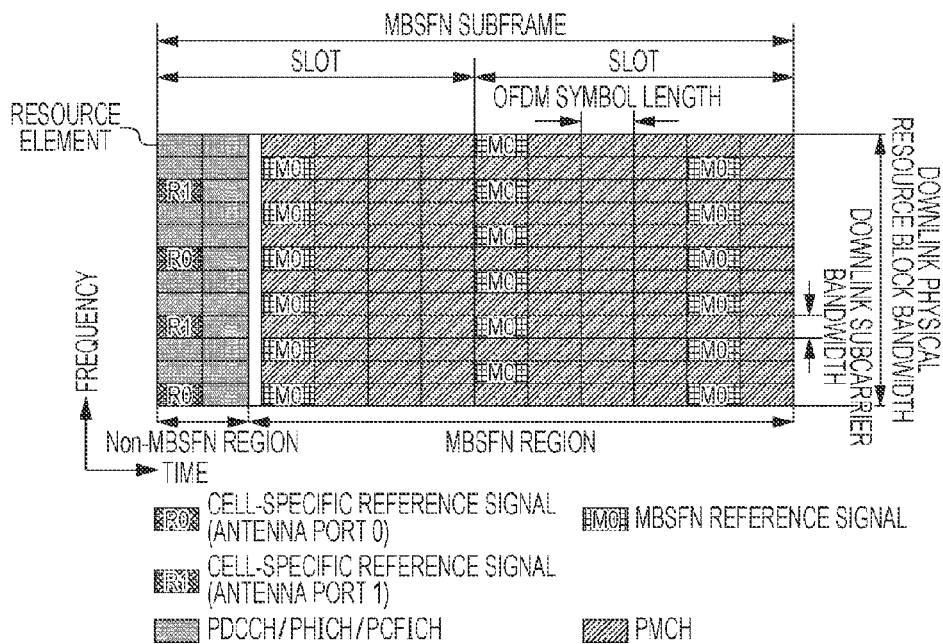
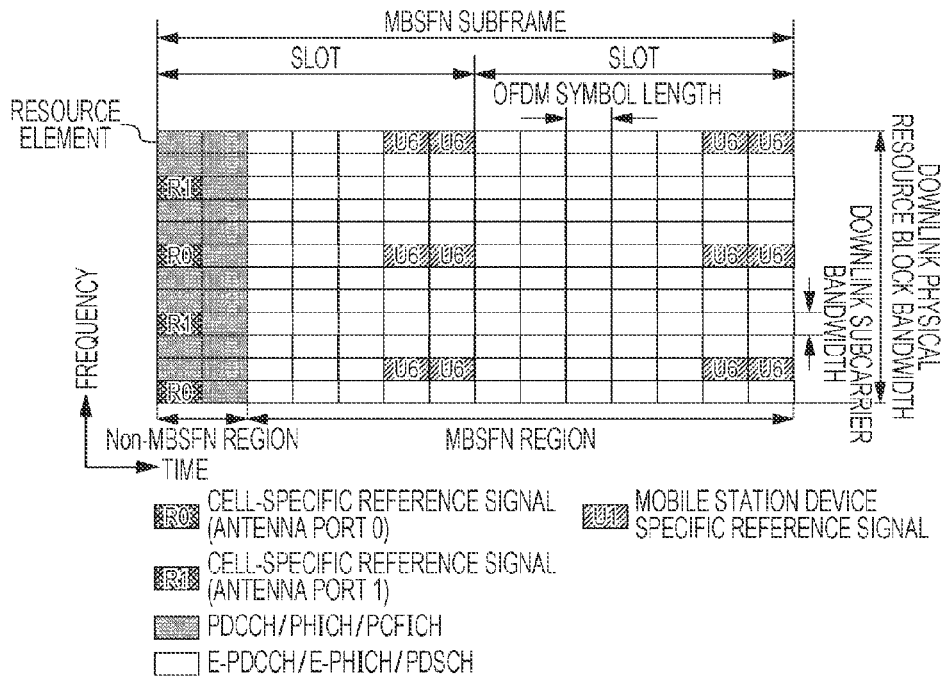

MOBILE STATION DEVICE, BASE STATION DEVICE, WIRELESS COMMUNICATION METHOD, AND INTEGRATED CIRCUIT

TECHNICAL FIELD

The present invention relates to a mobile station device, a base station device, a wireless communication system, a wireless communication method, and an integrated circuit.

BACKGROUND ART

The evolution (hereinafter, referred to as "Long Term Evolution (LTE)" or "Evolved Universal Terrestrial Radio Access (EUTRA)") of a wireless access system of cellular mobile communication and a wireless network is specified in the 3rd Generation Partnership Project (3GPP). In LTE, an Orthogonal Frequency Division Multiplexing (OFDM) scheme which is multi-carrier transmission is used as a communication scheme of wireless communication from a base station device to a mobile station device (referred to as downlink (DL)). Further, in LTE, a Single-Carrier Frequency Division Multiple Access (SC-FDMA) scheme which is single carrier transmission is used as a communication scheme of wireless communication from a mobile station device to a base station device (referred to as uplink (UL)). In LTE, a Discrete Fourier Transform-Spread OFDM (DFT-Spread OFDM) scheme is used as the SC-FDMA scheme. In the 3GPP, LTE-Advanced (LTE-A) by evolving LTE and applying a new technology thereto has been studied.

At least supporting a channel structure identical to that of LTE has been studied in LTE-A. A channel means a medium to be used for transmitting a signal. A channel to be used in a physical layer is referred to as a physical channel. A channel to be used in a Medium Access Control (MAC) layer is referred to as a logical channel. The type of the physical channel includes a Physical Downlink Shared CHannel (PDSCH) to be used for transmitting and receiving downlink data and control information, a Physical Downlink Control CHannel (PDCCH) to be used for transmitting and receiving downlink control information, and the like. The mobile station device or the base station device allocates signals generated from control information, data, and the like to respective physical channels, and transmit them.

In LTE, Multimedia Broadcast and Multicast Service (MBMS) is specified. A Physical Multicast Channel (PMCH) is a physical channel to be used for the MBMS. The PMCH and the PDSCH are time-multiplexed. In LTE, the PMCH and the PDSCH are not transmitted simultaneously in a single subframe.

The mobile station device needs to acquire control information representing a modulation scheme used for a data signal, a coding rate, a spatial multiplexing number, a transmission power adjustment value, and resource allocation, with respect to a reception process of a data signal. In LTE-A, introducing a new control channel (Enhanced-Physical Downlink Control Channel: E-PDCCH) for transmitting control information regarding a data signal has been considered (NPL 1). For example, improving the capacity of the entire control channel has been studied. For example, supporting interference coordination in a frequency domain for the new control channel has been studied. In a subframe, the E-PDCCH and the PDSCH are time-multiplexed and/or frequency-multiplexed.

In LTE-A, introducing a new channel (Enhanced-Physical Hybrid Automatic Repeat reQuest Indicator Channel: E-PHICH) using the same principle as that of the E-PDCCH, to the channel (Physical Hybrid Automatic Repeat reQuest Indicator Channel: PHICH) for transmitting ACK/NACK for an uplink data signal in the downlink has been considered (NPL 2).

CITATION LIST

Non Patent Literature

NPL 1: 3GPP TSG RAN1 #66b is, Zhuhai, China, 10-14, Oct. 2011, R1-113589 "Way Forward on downlink Control channel enhancements by UE-specific RS"

NPL 2: 3GPP TSG RAN1 #67, San Francisco, USA, 14-18, Nov. 2011, R1-113682 "Views on Enhanced PHICH"

SUMMARY OF INVENTION

Technical Problem

However, in certain subframes, the E-PHICH and the PMCH are not transmitted simultaneously. Further, the mobile station device which is not interested in the MBMS does not know that any subframe is used for transmitting PMCH. Thus, there is a problem that the mobile station device attempts to receive the E-PHICH and decodes incorrect information, in the subframe that is used for transmitting the PMCH and is not used for transmitting the E-PHICH.

The present invention has been made in view of the above circumstance, and an object is to provide a mobile station device, a base station device, a wireless communication system, a wireless communication method, and an integrated circuit, which may communicate properly by using an E-PHICH.

Solution to Problem (1) In order to achieve the object, the present invention takes measures as described below. In other words, a base station device of the present invention is a base station device which communicates with a mobile station device, including: a higher layer processing unit that indicates a Multicast/Broadcast over Single Frequency Network (MBSFN) subframe which is a subset of downlink subframes and in which a downlink physical channel for transmitting HARQ information and related to a reference signal different from a cell-specific reference signal is transmitted; and a transmission unit that transmits the downlink physical channel, in the indicated MBSFN subframe.

(2) Further, a mobile station device of the present invention is a mobile station device which communicates with a base station device, including: a higher layer processing unit that configures a Multicast/Broadcast over Single Frequency Network (MBSFN) subframe which is a subset of downlink subframes and for which decoding of a downlink physical channel for transmitting HARQ information and related to a reference signal different from a cell-specific reference signal is attempted; and a reception unit that attempts to decode the downlink physical channel, in the configured MBSFN subframe.

(3) Further, a wireless communication method of the present invention is a wireless communication method used in a base station device which communicates with a mobile station device, including: indicating a Multicast/Broadcast over Single Frequency Network (MBSFN) subframe which is a subset of downlink subframes and in which a downlink physical channel for transmitting HARQ information and related to a reference signal different from a cell-specific reference signal is transmitted; and transmitting the downlink physical channel, in the indicated MBSFN subframe.

(4) Further, a wireless communication method of the present invention is a wireless communication method used in a mobile station device which communicates with a base station device, including: configuring a Multicast/Broadcast over Single Frequency Network (MBSFN) subframe which is a subset of downlink subframes and for which decoding of a downlink physical channel for transmitting HARQ information and related to a reference signal different from a cell-specific reference signal is attempted; and attempting to decode the downlink physical channel, in the configured MBSFN subframe.

(5) Further, an integrated circuit of the present invention is an integrated circuit which causes a base station device to exhibit a plurality of functions by being mounted on the base station device which communicates with a mobile station device, the integrated circuit causing the base station device to exhibit a series of functions including: a function of indicating a Multicast/Broadcast over Single Frequency Network (MBSFN) subframe which is a subset of downlink subframes and in which a downlink physical channel for transmitting HARQ information and related to a reference signal different from a cell-specific reference signal is transmitted; and a function of transmitting the downlink physical channel, in the indicated MBSFN subframe.

(6) Further, an integrated circuit of the present invention is an integrated circuit which causes a mobile station device to exhibit a plurality of functions by being mounted on the mobile station device which communicates with a base station device, the integrated circuit causing the mobile station device to exhibit a series of functions including: a function of configuring a Multicast/Broadcast over Single Frequency Network (MBSFN) subframe which is a subset of downlink subframes and for which decoding of a downlink physical channel for transmitting HARQ information and related to a reference signal different from a cell-specific reference signal is attempted; and a function of attempting to decode the downlink physical channel, in the configured MBSFN subframe.

Advantageous Effects of Invention

According to the present invention, the mobile station device and the base station device may communicate properly by using an E-PHICH.

BRIEF DESCRIPTION OF DRAWINGS

FIG. 8 is a diagram illustrating an example of mapping of the downlink reference signal in an MBSFN subframe used for transmitting the PMCH of the present embodiment.

FIG. 9 is a diagram illustrating an example of mapping of the downlink reference signal in the MBSFN subframe used for transmitting the PDSCH of the present embodiment.

DESCRIPTION OF EMBODIMENTS

First Embodiment

Hereinafter, a first embodiment of the present invention will be described.

Figure 1:
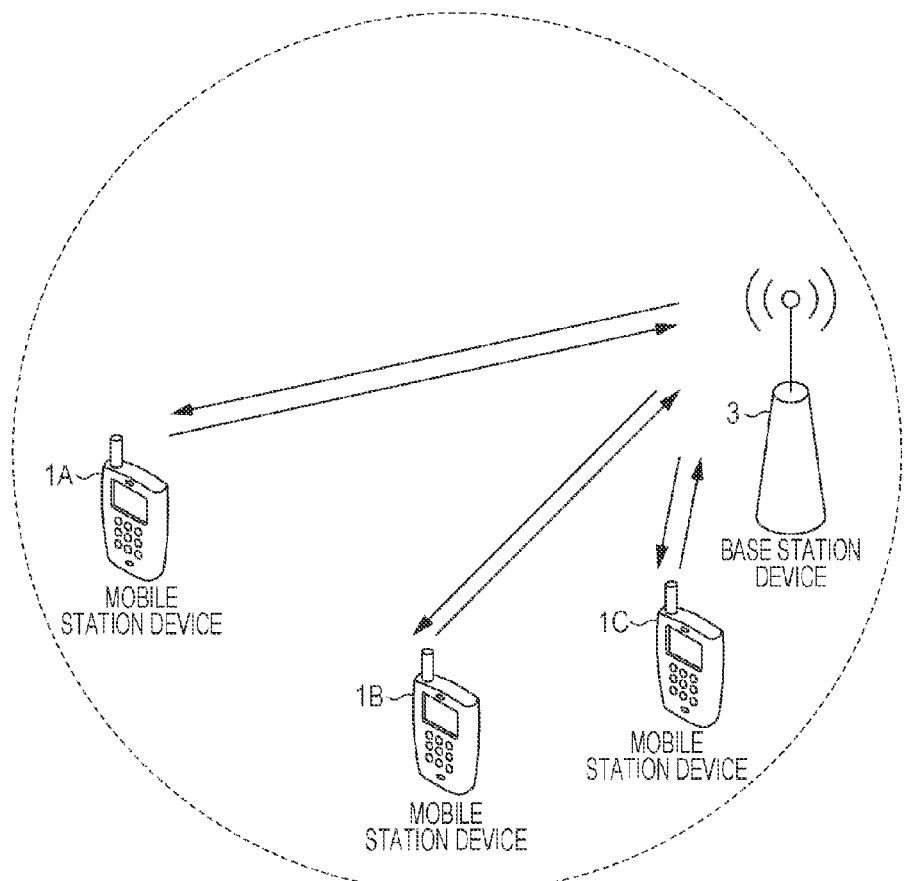
FIG. 1 is a conceptual diagram of a wireless communication system of the present embodiment.

FIG. 1 is a conceptual diagram of a wireless communication system of the present embodiment. In FIG. 1, the wireless communication system includes a base station device 3 and mobile station devices 1A to 1C. Hereinafter, the mobile station devices 1A to 1C are referred to as a mobile station device 1.

The channels of the present embodiment will be described.

Further, in FIG. 1, the following signals and physical channels are used in the uplink wireless communication from the mobile station device 1 to the base station device 3. The channels used in the physical layer are referred to as physical channels.

Uplink Reference Signal: UL RS
Physical Uplink Control Channel: PUCCH
Physical Uplink Shared Channel: PUSCH
Physical Random Access Channel: PRACH The base station device 3 uses the uplink reference signal to perform synchronization on a time domain of uplink. Further, the base station device 3 uses the uplink reference signal to measure the reception quality of the uplink. Further, the base station device 3 uses the uplink reference signal to perform channel compensation of the PUCCH and the PUSCH.

The PUCCH is a physical channel used for transmitting Uplink Control Information (UCI) which is information used for controlling the communication. The uplink control information includes Channel State Information (CSI) of downlink, a Scheduling Request (SR) indicating a request for radio resources of the PUSCH, and an acknowledgement (ACK)/negative-acknowledgement (NACK) indicating the success or failure of decoding of the downlink data that the mobile station device 1 has received.

The PUSCH is a physical channel used for transmitting Uplink data (Uplink-Shared Channel: UL-SCH) and the uplink control information (ACK/NACK and/or channel state information).

The PRACH is a physical channel used for transmitting a random access preamble. The primary purpose of the PRACH is for the base station device 3 to perform synchronization with the mobile station device 1 on the time domain. In addition thereto, the PRACH is used for an initial connection establishment procedure, a handover procedure, a connection re-establishment procedure, a synchronization for uplink transmission (timing adjustment), and a request for allocation of uplink radio resources.

In FIG. 1, the following signals and physical channels are used in wireless communication of downlink from the base station device 3 to the mobile station device 1:

Synchronization signal (SS)
Downlink Reference Signal (DL RS)
Physical Broadcast Channel (PBCH)
Physical Control Format Indicator Channel (PCFICH)
Physical Hybrid automatic repeat request Indicator Channel (PHICH)
Enhanced-Physical Hybrid automatic repeat request Indicator Channel (E-PHICH)
Physical Downlink Control Channel (PDCCH)
Enhanced-Physical Downlink Control Channel (PDCCH)
Physical Downlink Shared Channel (PDSCH)
Physical Multicast Channel (PMCH).

The mobile station device 1 uses the synchronization signal to perform synchronization on the frequency domain and time domain of the downlink.

The downlink reference signal is defined as the following four types:

Cell-specific Reference Signals (CRS)
Multicast/Broadcast over Single Frequency Network Reference Signals (MBSFN RS)
mobile station device specific reference signal (User Equipment-specific Reference Signals: URS)
Channel State Information Reference Signals (CSI-RS)

The mobile station device 1 uses the Cell-specific reference signal to perform synchronization on the frequency domain and time domain of the downlink. The mobile station device 1 uses the Cell-specific reference signal to perform channel compensation of the PCFICH, the PHICH, the PDCCH, and the PDSCH. The mobile station device 1 uses the Cell-specific reference signal 1 to calculate the channel state information of the downlink. The Cell-specific reference signal is a reference signal intended for a plurality of mobile station devices 1. The Cell-specific reference signal is transmitted over the entire band of the downlink.

The mobile station device 1 uses the MBSFN reference signal to perform channel compensation of PMCH. The MBSFN reference signal is a reference signal intended for a plurality of mobile station devices 1. The MBSFN reference signal is transmitted over the entire band of the downlink.

The mobile station device 1 uses the mobile station device-specific reference signal to perform channel compensation of the E-PHICH, the E-PDCCH, and the PDSCH. The mobile station device-specific reference signal is a reference signal intended for a particular mobile station device 1. The mobile station device-specific reference signal is transmitted only in the band used for transmitting the PDSCH intended for the corresponding mobile station device 1.

The mobile station device 1 uses the channel state information reference signal to calculate the channel state information of the downlink. The channel state information reference signal is transmitted only in the band that the base station device 3 has configured.

The PBCH is a physical channel used for broadcasting system information (master information block and Broadcast Channel (BCH)) used in common by the mobile station devices 1. The PBCH is transmitted at 40 ms-intervals. The timing of the 40 ms-intervals is blindly detected by the mobile station device 1. In addition, the PBCH is re-transmitted at 10 ms-intervals.

The PCFICH is a physical channel used for transmitting information indicating a region (OFDM symbol) that is reserved for the transmission of the PDCCH.

The PHICH and the E-PHICH are physical channels used for transmitting the HARQ indicator (HARQ feedback and response information) indicating success or failure of decoding of the uplink data (Uplink Shared Channel: UL-SCH) that the base station device 3 has received. If the base station device 3 has successfully decoded the uplink data, it sets the HARQ indicator for the uplink data to ACKnowledgement (ACK). If the base station device 3 fails in decoding of the uplink data, it sets the HARQ indicator for the uplink data to Negative ACKnowledgement (NACK). On a single PHICH, a HARQ indicator for a single piece of uplink data is transmitted. The base station device 3 transmits the respective HARQ indicators for the plurality of pieces of uplink data included in the same PUSCH by using the PHICH.

The PDCCH and the E-PDCCH are physical channels used for transmitting Downlink Control Information (DCI) such as a downlink grant (downlink assignment) and an uplink grant. The downlink grant is downlink control information used for scheduling of a single PDSCH in a single cell. The Uplink grant is the downlink control information used for scheduling a single PUSCH in a single cell.

The PDSCH is a physical channel used for transmitting downlink data (Downlink Shared Channel: DL-SCH).

The PMCH is a physical channel used for transmitting information (Multicast Channel: MCH) regarding a Multimedia Broadcast and Multicast Service (MBMS).

The BCH, the MCH, the UL-SCH, the DL-SCH, and the like are transport channels. The channels used in a Medium Access Control (MAC) layer are referred to as transport channels. The unit of the transport channels used in the MAC layer is referred to as a transport block (TB) or a MAC Protocol Data Unit (PDU). The Control of the Hybrid Automatic Repeat request (HARQ) is performed in each transport block in the MAC layer. The transport block is a unit of data that is delivered to the physical layer from the MAC layer. In the physical layer, the transport block is mapped to a code-word, and a coding process is performed for each code-word.

The base station device 3 may configure each mobile station device 1 so as to perform reception processes of the E-PHICH and the E-PDCCH and/or the PHICH and the PDCCH through the signals of the higher layer. By using the default configuration, the mobile station device 1 performs the reception process of the PHICH and the PDCCH, and does not perform the reception process of the E-PHICH and the E-PDCCH. In other words, the information is information indicating whether or not the HARQ indicator for transmitting the transport block needs to be received by using the E-PHICH. Further, the information is information indicating whether or not the downlink control information needs to be received by using the E-PDCCH.

In addition, the base station device 3 transmits the HARQ indicator for the uplink transport blocks that is scheduled by the downlink control information that has been transmitted by using the E-PDCCH, by using the E-PHICH. Further, the base station device 3 transmits the HARQ indicator for the uplink transport block that is scheduled by the downlink control information that has been transmitted by using the PDCCH, by using the PHICH.

In addition, the mobile station device 1 receives the HARQ indicator for the transport blocks transmitted based on the downlink control information which has been received by using the E-PDCCH, by using the E-PHICH. The mobile station device 1 receives the HARQ indicator for the transport blocks transmitted based on the downlink control information which has been received by using the PDCCH, by using the PHICH.

The frame configuration of the present embodiment will be described.

Figure 2:
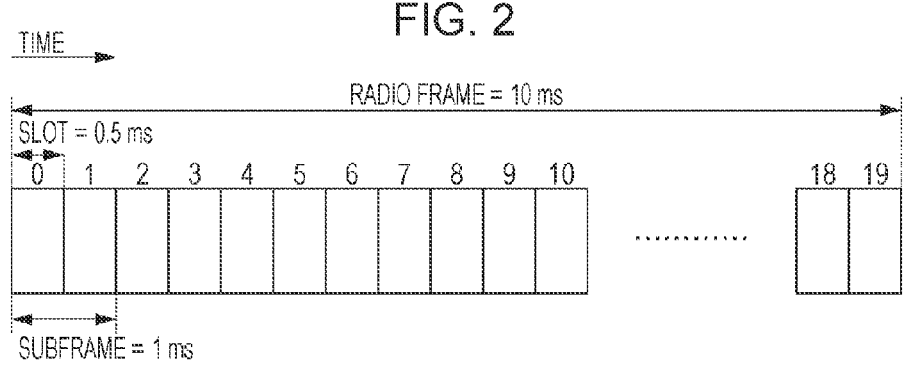
FIG. 2 is a diagram illustrating a frame configuration of the present embodiment.

FIG. 2 is a diagram illustrating a frame configuration of the present embodiment. In FIG. 2, the horizontal axis represents a time domain. The uplink transmission and the downlink transmission are organized in radio frames. The length of each of single radio frame is 10 ms. Further, each radio frame is configured with 20 slots. The length of each slot is 0.5 ms. The slots in the radio frame are numbered from 0 to 19. A subframe is defined as two consecutive slots. The length of each subframe is 1 ms. The i-th subframe in the radio frame is configured with a (2×i)-th slot and a (2×i+1)-th slot.

For Frequency Division Duplex (FDD), at each 10 ms-interval, 10 subframes may be used for downlink transmission and 10 subframes may be used for uplink transmission. For FDD, the downlink transmission and the uplink are separated on the frequency domain. For Time Division Duplex (TDD), each subframe is reserved for uplink transmission and downlink transmission. Hereinafter, the present embodiment will be described by considering the system of FDD. However, the present invention is not limited only to systems and devices of FDD, and the present invention may be applied to systems and devices of TDD.

A subset of the downlink subframes in the radio frames may be configured as a Multicast/Broadcast over Single Frequency Network (MBSFN) subframe by a higher layer. The MBSFN subframe is a subframe that is reserved for MBSFN. The downlink subframes that have not been configured as the MBSFN subframes are referred to as non-MBSFN subframes or unicast subframes. The uplink subframe in the radio frame is not used for the MBSFN.

The base station device 3 transmits information (MBSFNsubframeConfigList) indicating the subframes that are reserved for the MBSFN subframes, to the mobile station device 1. The mobile station device 1 configures the subset of downlink subframes as the MBSFN subframe, according to the received MBSFNsubframeConfigList. In other words, the MBSFN subframe is a subframe that is indicated by MBSFNsubframeConfigList.

In the non-MBSFN subframes, the base station device 3 is able to transmit the PDSCH, and is not able to transmit the PMCH. Further, in the MBSFN subframe, the base station device 3 is able to transmit any one of the PDSCH and the PMCH. The base station device 3 may transmit a plurality of PDSCHs in a single subframe. In the single subframe, the plurality of PDSCHs may be frequency-multiplexed and spatially multiplexed. The base station device 3 may transmit a single PMCH by using an entire band in the subframe, in a single subframe.

Each of the MBSFN subframes is divided into a non-MBSFN region and an MBSFN region. The non-MBSFN region is configured with the first one or two OFDM symbols in the MBSFN subframe. The MBSFN region is configured with OFDM symbols that are not used as the non-MBSFN region in the MBSFN subframe. The non-MBSFN region is a region that has not been reserved for MBSFN. The MBSFN region is a region that is reserved for MBSFN.

Figure 3:
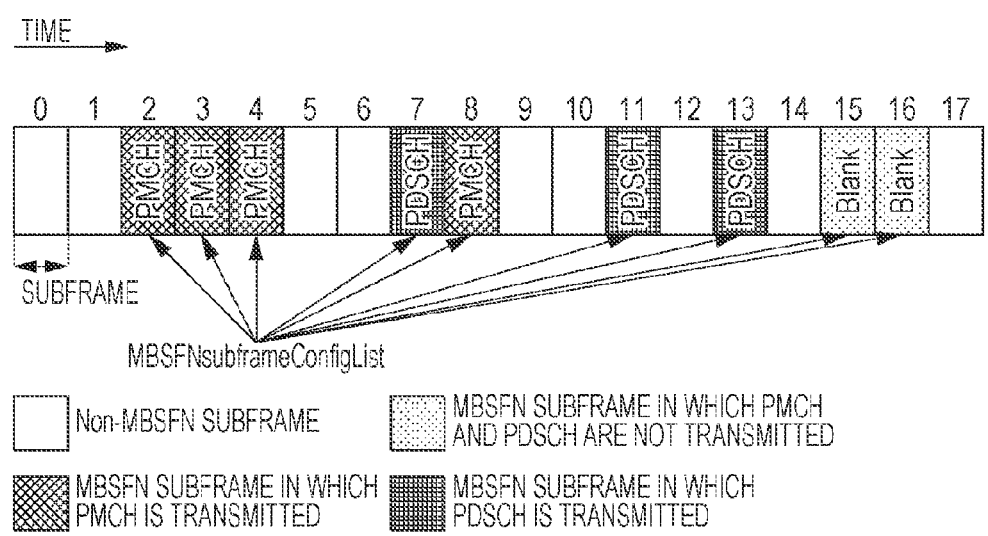
FIG. 3 is a diagram illustrating an example of configuration of an MBSFN subframe of the present embodiment.

FIG. 3 is a diagram illustrating an example of the configuration of MBSFN subframes of the present embodiment. In FIG. 3, the horizontal axis represents a time domain. In FIG. 3, subframes {2, 3, 4, 7, 8, 11, 13, 15, and 16} are the MBSFN subframes, and the remaining subframes are the non-MBSFN subframes. In FIG. 3, the subframes {2, 3, 4, and 8} are the MBSFN subframes used for transmitting the PMCH. In FIG. 3, subframes {7, 11, and 13} are the MBSFN subframes used for transmitting the PDSCH. In FIG. 3, the subframes {15 and 16} are the MBSFN subframes in which either the PMCH or the PDSCH is not transmitted. Hereinafter, the MBSFN subframes which are used for transmitting the PDSCH and the non-MBSFN subframes which are used for transmitting the PDSCH are referred to as a first subframe. Further, the MBSFN subframes used for transmitting the PMCH are referred to as a second subframe.

The configuration of a subframe (slot) of the present embodiment will be described.

A signal and a physical channel which are transmitted in each subframe are represented by a resource grid. The resource grid is defined by a plurality of subcarriers and a plurality of Orthogonal Frequency Division Multiplexing (OFDM) symbols (or Single-Carrier Frequency Division Multiple Access (SC-FDMA) symbols). Each element in the resource grid is referred to as a resource element. The resource element is identified by using a subcarrier number and an OFDM symbol (SC-FDMA symbol) number. The number of subcarriers constituting one slot is dependent on the bandwidth of the carrier.

Figure 4:
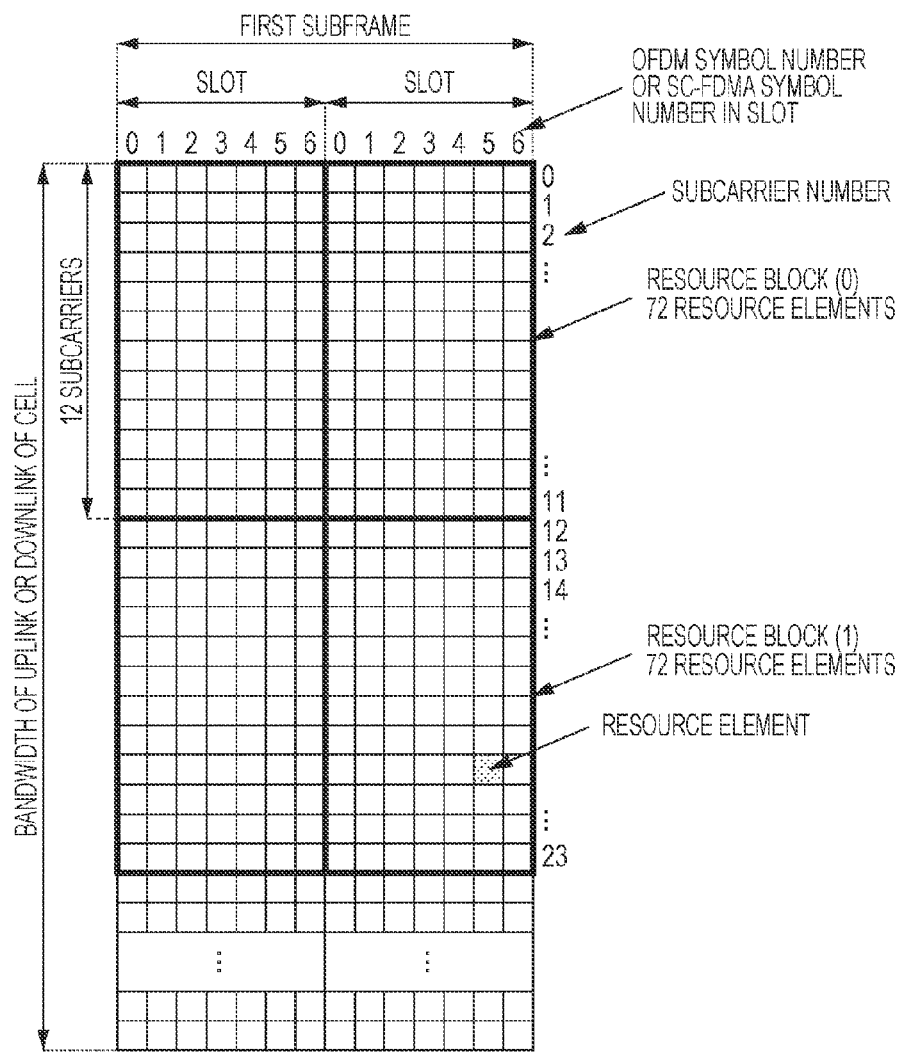
FIG. 4 is a diagram illustrating a configuration of a first subframe used for transmitting a PDSCH of the present embodiment.

FIG. 4 is a diagram illustrating a configuration of a first subframe used for transmitting the PDSCH in the present embodiment. In FIG. 4, the horizontal axis represents a time domain, and the vertical axis represents a frequency domain. In the first subframe (non-MBSFN subframe or MBSFN subframe), the number of OFDM symbols (SC-FDMA symbols) constituting one slot is seven.

The resource blocks are used to represent the mapping of the resource elements in a specific physical channel (such as PDSCH). In the resource block, a virtual resource block and a physical resource block are defined. First, a specific physical channel is mapped to a virtual resource block. Thereafter, the virtual resource block is mapped to the physical resource block. Further, one physical resource block corresponds to one slot on the time domain and to 180 kHz on the frequency domain. The physical resource blocks are numbered from 0 on the frequency domain. In the first subframe, one physical resource block is defined by seven continuous OFDM symbols (SC-FDMA symbols) on the time domain and 12 contiguous subcarriers on the frequency domain. Thus, in the first subframe, one physical resource block is configured with (7×12) resource elements.

Figure 5:
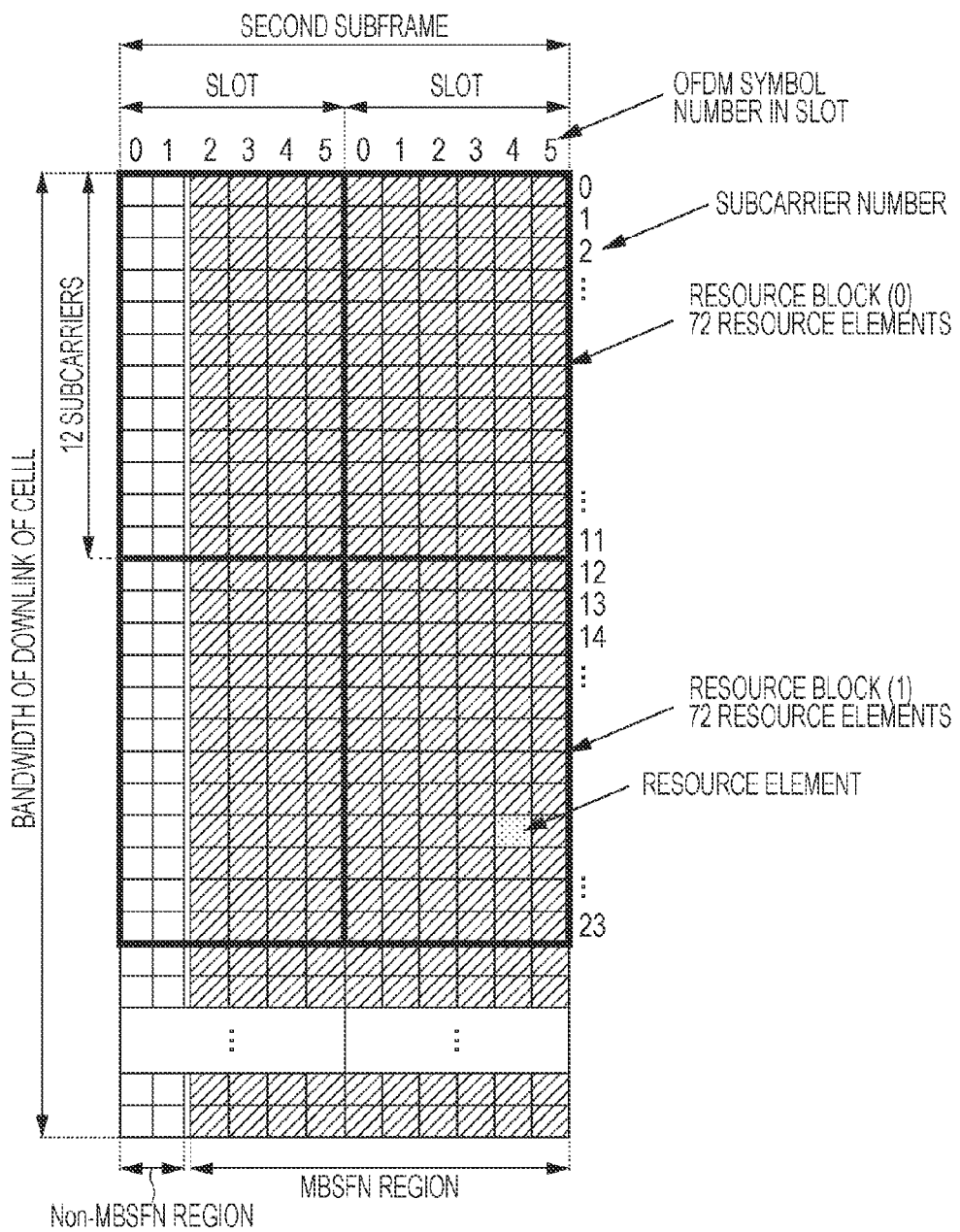
FIG. 5 is a diagram illustrating a configuration of a second subframe used for transmitting a PMCH of the present embodiment.

FIG. 5 is a diagram illustrating a configuration of a second subframe used for transmitting the PMCH in the present embodiment. In FIG. 5, the horizontal axis represents the time domain, and the vertical axis represents the frequency domain. In the second subframe (MBSFN subframes), the number of OFDM symbols constituting one slot is six. In the second subframe, one physical resource block is defined by six continuous OFDM symbols on the time domain and 12 contiguous subcarriers on the frequency domain. Thus, in the second subframe, one physical resource block is configured with (6×12) pieces of resource elements.

In the second subframe, a guard interval of the OFDM symbol of the MBSFN region is longer than the guard interval of the OFDM symbol of the non-MBSFN region.

An example of an arrangement of a physical downlink channel of the present embodiment will be described.

Figure 6:
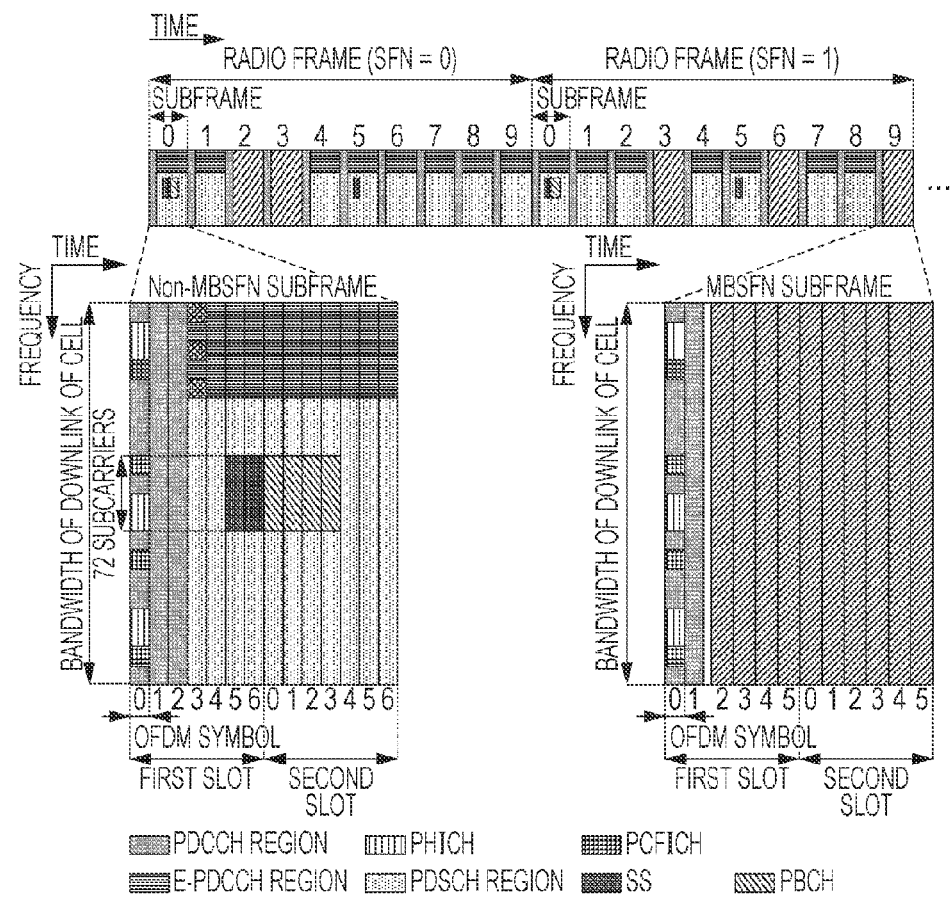
FIG. 6 is a diagram illustrating an example of an arrangement of a physical downlink channel of the present embodiment.

FIG. 6 is a diagram illustrating an example of the arrangement of the physical downlink channel of the present embodiment. In FIG. 6, the horizontal axis represents the time domain and the vertical axis represents the frequency domain. The PCFICH is mapped to the OFDM symbol of the number 0 (first) in the non-MBSFN subframe or the MBSFN subframe. Further, the PCFICH is mapped to four resource element groups distributed on the frequency domain. The resource element group is configured with the plurality of contiguous resource elements on the frequency domain.

The PHICH is mapped to the OFDM symbol of the number 0 (first) in the non-MBSFN subframe or the MBSFN subframe. One PHICH is mapped to three resource element groups that are distributed on the frequency domain. Further, the base station device 3 may code and multiplex a plurality of PHICHs on the same resource elements.

The PDCCH is mapped to OFDM symbols of the number 0, the number 0 and the number 1, or from the number 0 up to the number 2 in the subframe in the non-MBSFN subframe. The PDCCH is mapped to OFDM symbols of the number 0, or the number 0 and the number 1 in the subframe in the MBSFN subframe. In the OFDM symbol of the number 0, the PDCCH is mapped while avoiding the resources elements to which PCFICH and PHICH are mapped. The mobile station device 1 recognizes the OFDM symbol to which PDCCH is mapped, based on the information received in the PCFICH. Further, the base station device 3 may time-multiplex and frequency-multiplex the plurality of PDCCHs in a single subframe.

The PDSCH is mapped to the OFDM symbols to which the PDCCH is not mapped, in the non-MBSFN subframe or the MBSFN subframe. The base station device 3 may frequency-multiplex, time-multiplex and/or spatial multiplex the plurality of PDSCHs in a single subframe.

The E-PHICH is mapped to the fourth OFDM symbol in the non-MBSFN subframe or the MBSFN subframe. One E-PHICH is mapped to three resource element groups distributed on the frequency domain. Further, the base station device 3 may code and multiplex a plurality of E-PHICHs on the same resource elements.

The E-PDCCH is mapped to the OFDM symbols to which the PDCCH is not mapped, in the non-MBSFN subframe or the MBSFN subframe. The E-PDCCH and the E-PHICH are time-multiplexed and frequency-multiplexed. The E-PDCCH and the PDSCH are time-multiplexed. The base station device 3 may frequency-multiplex, time-multiplex and/or spatial-multiplex the plurality of E-PDCCHs in a single subframe.

The PMCH is mapped on the MBSFN region in the MBSFN subframe. The base station device 3 may transmit a single PMCH in a single subframe.

A synchronization signal is transmitted in the subframes of the number 0 and the number 5 in each radio frame on the time domain. In the subframes of the number 0 and the number 5, the synchronization signal is transmitted in the OFDM symbols of the number 5 and the number 6 of the first slot. Further, on the frequency domain, the synchronization signal is transmitted in the 72 subcarriers in the center of the downlink of a cell.

The PBCH is transmitted in the subframe of the number 0 in each radio frame on the time domain. In the subframe of the number 0, the PBCH is transmitted in the OFDM symbols of the number 0 to the number 3 of the second slot. Further, on the frequency domain, the PBCH is transmitted in the 72 subcarriers in the center of the downlink of a cell.

In the subframes in which the synchronization signal and/or the PBCH are transmitted, the base station device 3 does not transmit the PMCH. The base station device 3 does not reserve the subframes in which the synchronization signal and/or the PBCH are transmitted as the MBSFN subframes. In other words, the subframes in which the synchronization signal and/or the PBCH are transmitted are non-MBSFN subframes.

An example of the mapping of the downlink reference signals according to the present embodiment will be described.

Figure 7:
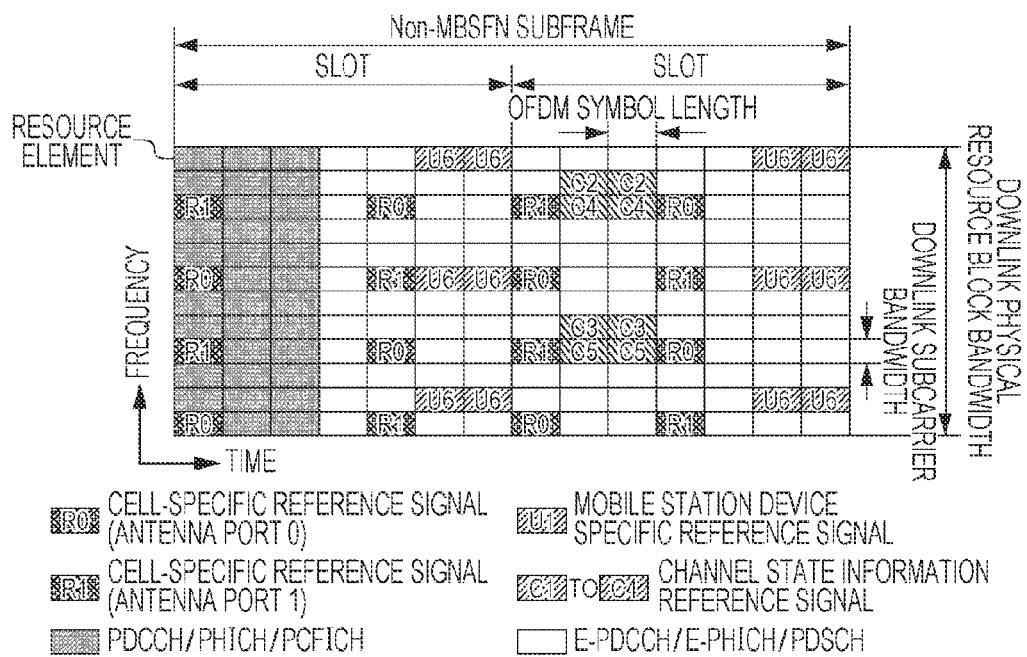
FIG. 7 is a diagram illustrating an example of mapping of a downlink reference signal in a non-MBSFN subframe used for transmitting the PDSCH of the present embodiment.

FIG. 7 is a diagram illustrating an example of the mapping of downlink reference signals in the non-MBSFN subframes used for transmitting the PDSCH according to the present embodiment. In FIG. 7, the horizontal axis represents the time domain, and the vertical axis represents the frequency domain. In FIG. 7, only physical resource blocks of the same number in the non-MBSFN subframe are illustrated. In FIG. 7, the squares to which Ri is attached are resource elements used for transmitting a cell-specific reference signal of the antenna port i (i=0, 1). In FIG. 7, the squares to which Cj is attached are resource elements used for transmitting the channel state information reference signal of an antenna port j (j=2, 3, 4, 5). In FIG. 7, the squares to which U6 is attached are resource elements used for transmitting the mobile station device-specific reference signal of the antenna port 6.

The resource elements used for transmitting the CRS are determined based on a physical-layer cell identity (PCI, Cell ID) of a cell. The resource elements used for transmitting the CSI-RS in the physical resource block is configured by the base station device 3. The base station device 3 transmits the information regarding the configuration of the downlink subframe that is configured periodically and the CSI-RS indicating the resource elements used for transmitting the CSI-RS, to the mobile station device 1.

FIG. 8 is a diagram illustrating an example of mapping of a downlink reference signal in the MBSFN subframe used for transmitting the PMCH of the present embodiment. In FIG. 8, the horizontal axis represents the time domain, and the vertical axis represents the frequency domain. In FIG. 8, only the physical resource blocks of the same number in the MBSFN subframe are illustrated. In FIG. 8, the squares to which Ri is attached are resource elements used for transmitting a cell-specific reference signal of the antenna port i (i=0, 1). In FIG. 8, the squares to which M7 is attached are resource elements used for transmitting the MBSFN reference signal of the antenna port 7.

FIG. 9 is a diagram illustrating an example of mapping of a downlink reference signal in the MBSFN subframe used for transmitting PDSCH in the present embodiment. In FIG. 9, the horizontal axis represents the time domain, and the vertical axis represents the frequency domain. In FIG. 9, only the physical resource blocks of the same number in the MBSFN subframe are illustrated. In FIG. 9, the squares to which Ri is attached are resource elements used for transmitting a cell-specific reference signal of the antenna port i (i=0, 1). In FIG. 9, the squares to which U6 is attached are resource elements used for transmitting the mobile station device-specific reference signal of the antenna port 6.

The operation of the HARQ of uplink of the present embodiment will be described.

The HARQ of uplink of the present embodiment is a synchronous HARQ. The mobile station device includes one HARQ entity. The HARQ entity manages eight parallel HARQs.

Figure 10:
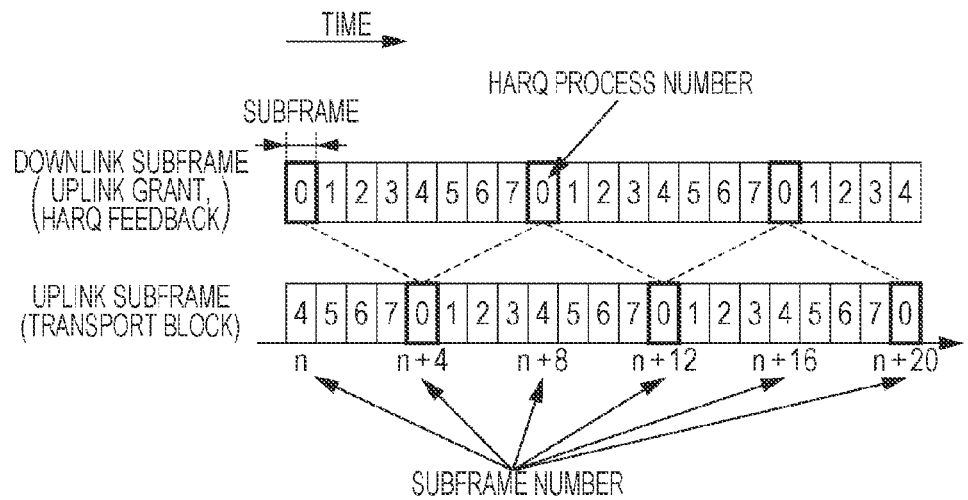
FIG. 10 is a diagram illustrating an example of a synchronous HARQ of the present embodiment.

FIG. 10 is a diagram illustrating an example of a synchronous HARQ of the present embodiment. In FIG. 10, the horizontal axis represents the time domain. In the synchronous HARQ, a HARQ process corresponds to an uplink subframe or a downlink subframe. A single uplink subframe or a single downlink subframe corresponds to a single HARQ process. Further, in the uplink subframe or the downlink subframe, the corresponding HARQ processes number is shifted by four.

For example, in FIG. 10, the base station device 3 transmits downlink control information and/or the HARQ indicator corresponding to the HARQ process of the number 0 by using the downlink subframe n. The mobile station device 1 transmits a transport block corresponding to the HARQ process of the number 0 by using the uplink subframe n+4, based on the downlink control information and/or the HARQ indicator.

The operation of the HARQ entity of the present embodiment will be described.

Figure 11:
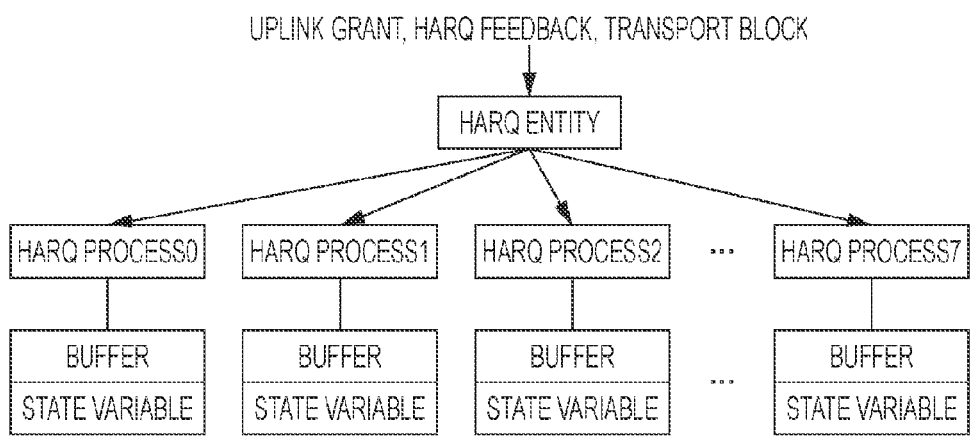
FIG. 11 is a diagram for describing an example of an operation of a HARQ entity of the present embodiment.

FIG. 11 is a diagram describing an example of the operation of the HARQ entity in the present embodiment. In FIG. 11, the HARQ entity manages the HARQ process 0 to the HARQ process 7. In FIG. 11, the HARQ entity outputs downlink control information, a HARQ indicator, and a transport block which are input to the appropriate HARQ entity. Each of the HARQ processes corresponds to a buffer and a state variable. In other words, each of the HARQ processes manages the buffer and the state variable. The HARQ process stores the downlink control information and the transport block, in each buffer. The HARQ process sets the state variable to ACK or NACK.

When the downlink control information and/or the HARQ indicator are received in a specific subframe, the HARQ entity specifies the HARQ process related to the specific subframe, and transmits the downlink control information and/or the HARQ indicator to the specified HARQ process.

When the downlink control information for the HARQ process is received and the downlink control information indicates the initial transmission of the transport block, or when the downlink control information for the HARQ process is received and the transport block is not stored in the buffer of the specified HARQ process, the HARQ entity acquires the transport block to be transmitted, sends the transport block, the downlink control information, and the HARQ indicator to the specified HARQ process, and makes a request of the initial transmission to the specified HARQ process.

When the downlink control information for the HARQ process is received and the downlink control information indicates the retransmission of the transport block, and the transport block is stored in the buffer of the specified HARQ process, the HARQ entity sends the downlink control information and the HARQ indicator to the specified HARQ process, and makes a request of adaptive retransmission to the specified HARQ process.

When the downlink control information for the HARQ process is not received, the HARQ entity sends the HARQ indicator to the specified HARQ process, and makes a request of non-adaptive retransmission to the specified HARQ process.

The HARQ process of the present embodiment will be described.

First, when the HARQ indicator for the transport block is input from the HARQ entity, the HARQ process sets the state variable to the value (ACK or NACK) of the HARQ indicator. Next, the HARQ process performs the following operations, depending on which one of the initial transmission, the adaptive retransmission, and the non-adaptive retransmission the HARQ entity requests.

When the HARQ entity requests the initial transmission, the HARQ process stores the transport block and the downlink control information, which are input from the HARQ entity, in the corresponding buffer, sets the corresponding state variable to a NACK, and instructs the physical layer to transmit the transport block that is stored according to the downlink control information which is stored.

When the HARQ entity requests the adaptive retransmission, the HARQ process stores the downlink control information which is input from the HARQ entity in the corresponding buffer, sets the corresponding state variable to NACK, and instructs the physical layer to transmit the transport block that is stored according to the downlink control information which is stored.

When the HARQ entity requests the non-adaptive retransmission and the corresponding state variable is set to NACK, the HARQ process instructs the physical layer to transmit the transport block that is stored according to the downlink control information which is stored.

When the HARQ entity requests the non-adaptive retransmission and the corresponding state variable is set to ACK, the HARQ process does not instruct a physical layer to transmit the transport block that is stored.

According to the instructions from the HARQ process, the physical layer codes and modulates the transport block, and transmits the transport block by using the PDSCH.

In addition, after instructing the physical layer to transmit the transport block that is stored, the HARQ process maintains the transport block in the buffer until a new transport block is input from the HARQ entity. Further, after instructing the physical layer to transmit the transport block that is stored, the HARQ process maintains the downlink control information in the buffer until new downlink control information is input from the HARQ entity. Further, when the MAC is reset, the HARQ process may discard the transport block and the downlink control information stored in the buffer.

The coding process and the decoding process of the downlink control information to be transmitted using the PDCCH or the E-PDCCH of the present embodiment will be described.

Figure 12:
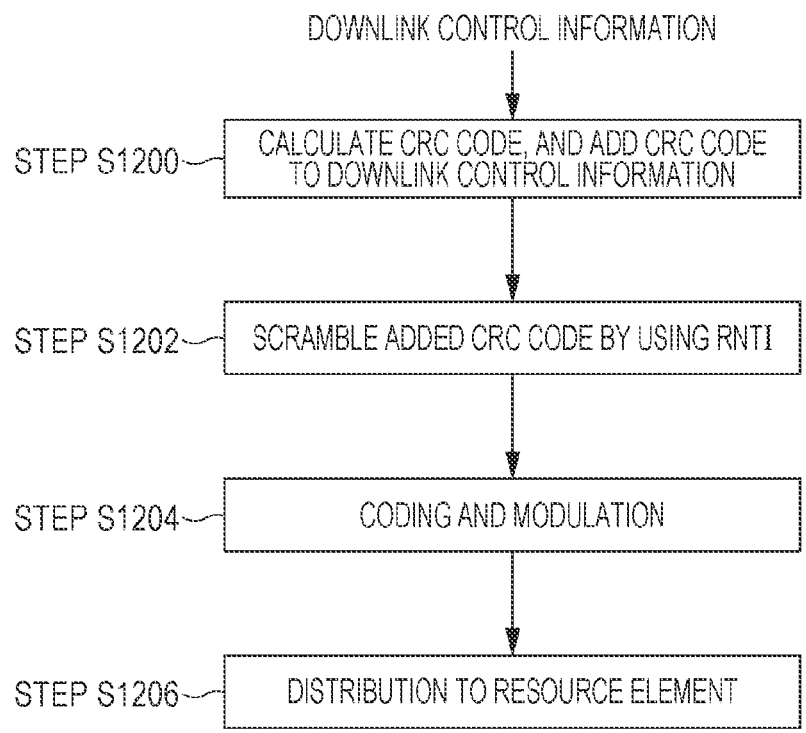
FIG. 12 is a flow diagram illustrating a coding method of downlink control information of the present embodiment.

FIG. 12 is a flowchart illustrating a coding method of the downlink control information of the present embodiment. The base station device 3 calculates a Cyclic Redundancy Check (CRC) code by using the downlink control information, and adds the CRC code to the downlink control information (step S1200). The base station device 3 scrambles the added CRC codes by using a Radio Network Temporary Identifier (RNTI) (step S1202). For example, when the downlink control information is intended for a specific mobile station device 1, the base station device 3 scrambles the CRC code by using the RNTI assigned to the specific mobile station device 1. The base station device 3 codes and modulates the downlink control information to generate a modulation symbol (step S1204). The base station device 3 arranges the modulation symbols of the downlink control information in the resource elements of the PDCCH or E-PDCCH (step S1206).

The mobile station device 1 acquires the modulation symbols from the candidates of the resource elements of the PDCCH or the E-PDCCH, and attempts to decode the downlink control information. Further, the mobile station device 1 generates the CRC code by using the downlink control information that has been decoded, and scrambles the generated CRC code by using the RNTI allocated to the base station device 3. The mobile station device 1 compares the CRC code that the mobile station device 1 has generated with the decoded CRC code. When the CRC code that the mobile station device 1 has generated and the decoded CRC code match, the mobile station device 1 assumes the decoding of the downlink control information to be successful, and delivers the downlink control information to the HARQ entity. When the CRC code that the mobile station device 1 has generated and the decoded CRC code do not match, the mobile station device 1 assumes the decoding of the downlink control information to have failed.

In this manner, the mobile station device 1 may determine whether or not the decoding of the downlink control information is successful, based on the CRC code. Therefore, even if the decoding of downlink control information is attempted in the MBSFN subframe which is used for transmitting the PMCH, the mobile station device 1 assumes the decoding of the downlink control information to have failed, and thus does not decode the incorrect downlink control information.

The coding process and decoding process of the HARQ indicator that is transmitted by using the PHICH or E-PHICH of the present embodiment will be described.

Figure 13:
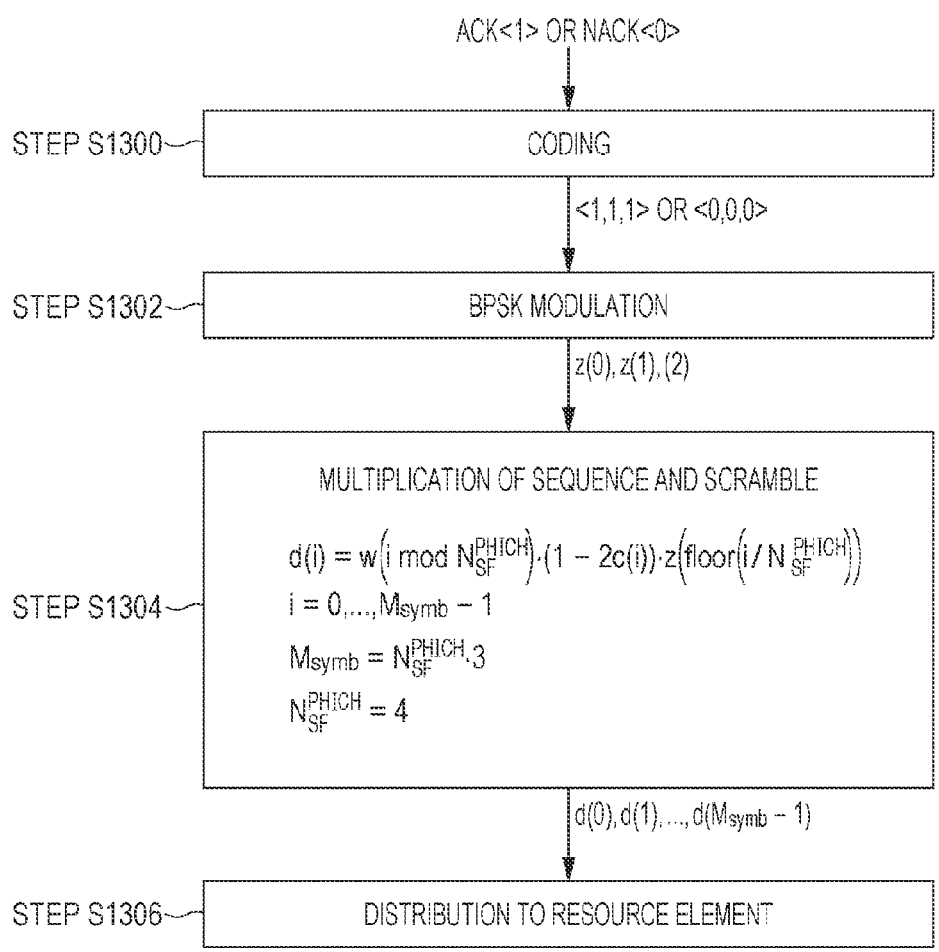
FIG. 13 is a flow diagram illustrating a coding method of a HARQ indicator of the present embodiment.

FIG. 13 is a flowchart illustrating a coding method of a HARQ indicator of the present embodiment. In FIG. 13, ACK is represented by <1>. NACK is represented by <0>. The base station device 3 generates a sequence of three bits <0, 0, 0> by coding the NACK <0>. The base station device 3 generates a sequence of three bits <1, 1, 1> by coding the ACK <1> (step S1300).

The base station device 3 generates three modulation symbols <z(0), z(1), z(2)> by BPSK-modulating the sequence that is generated in step S1300 (step S1302). The base station device 3 generates a sequence <d(0), d(1), ..., d($M_{symb}$–1)> of modulation symbols by multiplying and scrambling of the sequence on the modulation symbols generated in step S1302 (step S1304). The base station device 3 generates a sequence of the modulation symbols based on Expression (1). The length of the sequence <d(0), d(1), ..., d($M_{symb}$–1)> of the modulation symbol is 12.

$$d(i) = w(i \bmod N_{SF}^{PHICH}) \cdot (1 - 2c(i)) \cdot z(\text{floor}(i/N_{SF}^{PHICH}))$$

$$i = 0, \ldots, M_{symb} - 1$$

$$M_{symb} = N_{SF}^{PHICH} \cdot 3$$

$$N_{SF}^{PHICH} = 4 \qquad \text{[Expression 1]}$$

The [X] mod [Y] is a function for obtaining a remainder when [X] is divided by [Y]. floor ( ) is a function for obtaining the largest integer which is smaller than the number in parentheses. c( ) is a cell-specific scrambling sequence. c( ) is a pseudo-random sequence of which an initial values is configured, based on the physical layer cell identifier and the slot number. In other words, the modulation symbols of the PHICH and the E-PHICH are scrambled by c( ).

w( ) is an orthogonal sequence to be multiplied with the modulation symbols z( ) The sequence length of w( ) is 4. The sequence index $n^{seq}_{PHICH}$ is an index for identifying the orthogonal sequence w( ) to be multiplied with the modulation symbols of the PHICH or the E-PHICH. The sequence index $n^{seq}_{PHICH}$ corresponds to the PHICH number in the PHICH group. The PHICH group is arranged on the same resource element. A different orthogonal sequence w( ) is configured with a plurality of multiplied PHICHs or E-PHICHs. $N^{PHIcH}_{SF}$ is a spreading factor size used for modulation of the PHICH. The spreading factor size is 4.

The mobile station device 1 determines resource elements and orthogonal codes used for transmitting the HARQ indicator corresponding to the transmission of the uplink data link, based on the physical resource block used for transmitting uplink data. The mobile station device 1 performs a decoding process of the HARQ indicator by using the resource elements and orthogonal codes which are determined, and delivers the HARQ indicator to the HARQ entity.

However, since the CRC code is not added to the HARQ indicator, there is a problem that the mobile station device 1 is not able to determine whether or not the HARQ indicator has been correctly received, based on the CRC code. For example, if a time in which the mobile station device 1 receives the HARQ indicator for the transport block that has been transmitted by using the E-PHICH is the MBSFN subframe that is used for transmitting the PMCH, the mobile station device 1 performs a reception process while regarding the signals of the PMCH as the signals of the E-PHICH, and thus decodes the incorrect HARQ indicator. Therefore, since the incorrect HARQ indicator is delivered to the HARQ entity, the mobile station device 1 causes an erroneous operation of the HARQ process.

Therefore, the mobile station device 1 transmits the transport block to the base station device 3 by using the PUSCH, and if a time in which the HARQ indicator for the transmission of the transport block is received by using the E-PHICH is the MBSFN subframe, when the HARQ indicator for the transmission of the transport block is received, the mobile station device 1 sets the state variable managed by the HARQ process corresponding to the transport block to ACK. In other words, if a time in which the mobile station device 1 receives the HARQ indicator for the transmission of the transport block by using the E-PHICH is the MBSFN subframe, the mobile station device 1 may not perform the reception process of the E-PHICH. Otherwise, if a time in which the mobile station device 1 receives the HARQ indicator for the transmission of the transport block by using the E-PHICH is the MBSFN subframe, even if the mobile station device 1 performs the reception process of the E-PHICH, the mobile station device 1 may not deliver the HARQ indicator to the HARQ entity and may discard the HARQ indicator.

Further, the base station device 3 may not transmit the E-PDCCH, in the MBSFN subframe which is used for transmitting the PDSCH and/or the E-PDCCH.

Thus, if a time in which the mobile station device 1 receives the HARQ indicator for the transmission of the transport block by using the E-PHICH is the MBSFN subframe which is used for transmitting the PMCH, it is possible to prevent the mobile station device 1 from decoding the incorrect HARQ indicator.

Second Embodiment

Hereinafter, a second embodiment of the present invention will be described.

In the MBSFN subframe used for transmitting the PDSCH, it is preferable to transmit the E-PHICH. However, the mobile station device 1 does not know that any of the PMCH and the PDSCH is transmitted in the MBSFN subframe. Thus, in the first embodiment, the mobile station device 1 does not perform the reception process of the E-PHICH in the MBSFN subframes used for transmitting the PMCH and also in the MBSFN subframe used for transmitting the PDSCH, or discards the HARQ indicator received by using the E-PHICH.

Therefore, in the second embodiment, the base station device 3 transmits information (E-PHICHsubframeConfig) indicating the subframes which are reserved for the transmission of the HARQ indicator using the E-PHICH, among the MBSFN subframes, to the mobile station device 1. Otherwise, the base station device 3 broadcasts the information. The base station device 3 transmits (broadcasts) a signal (higher layer signal, radio resource control signal, radio resource control message) of the higher layer containing the information by using the PDSCH. The base station device 3 transmits the HARQ indicator by using the E-PHICH in the MBSFN subframes indicated by the information, among the MBSFN subframes. The base station device 3 may not transmit the HARQ indicator by using the E-PHICH in the MBSFN subframes which have not been indicated by the information, among the MBSFN subframes. In other words, the information is information indicating the MBSFN subframes in which the base station device 3 transmits E-PHICH and the MBSFN subframes in which the base station device 3 does not transmit the E-PHICH.

In the second embodiment, if a time in which the mobile station device 1 receives the HARQ indicator for the transmission of the transport block by using the E-PHICH is the MBSFN subframe indicated by the information, the mobile station device 1 receives the HARQ indicator for the transmission of the transport block by using the E-PHICH.

In the second embodiment, if a time in which the mobile station device 1 receives the HARQ indicator for the transmission of the transport block by using the E-PHICH is the MBSFN subframe excluding the MBSFN subframes indicated by the information, the mobile station device 1 sets the state variable managed by the HARQ process corresponding to the transport block to ACK when receiving the HARQ indicator for the transmission of the transport block.

Figure 14:
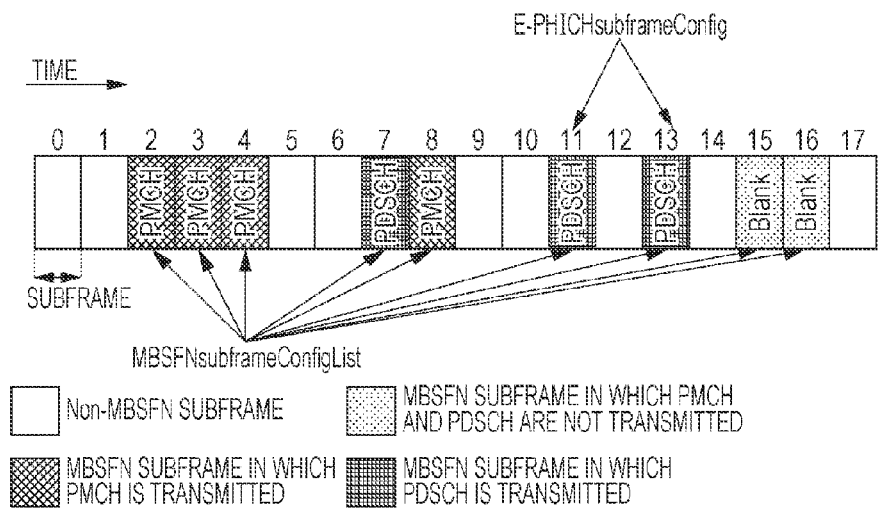
FIG. 14 is a diagram illustrating an MBSFN subframe that is reserved for transmitting a HARQ indicator using an E-PHICH in a second embodiment of the present invention.

FIG. 14 is a diagram illustrating MBSFN subframes that are reserved for the transmission of the HARQ indicator using the E-PHICH in the second embodiment of the present invention. In FIG. 14, the horizontal axis represents the time domain. In FIG. 14, the subframes {2, 3, 4, 7, 8, 11, 13, 15, and 16} are MBSFN subframes, and the remaining subframes are non-MBSFN subframes. In FIG. 14, the subframes {11 and 13} are MBSFN subframes that are reserved for the transmission of the HARQ indicator using the E-PHICH, and the subframes {2, 3, 4, 7, 8, 15, and 16} are MBSFN subframes which are not reserved for the transmission of the HARQ indicator using the E-PHICH. In FIG. 14, among the MBSFN subframes, information indicating the subframes to be reserved for the transmission of the HARQ indicator using the E-PHICH indicates subframes {11 and 13}.

For example, in FIG. 14, the base station device 3 transmits the E-PHICH in the subframes {11 and 13}, and does not transmit the E-PHICH in the subframes {2, 3, 4, 7, 8, 15, and 16}. For example, in FIG. 14, the mobile station device 1 receives the HARQ indicator using the E-PHICH in the subframes {11 and 13}, delivers the received HARQ indicator to the HARQ entity, and does not receive the HARQ indicator using the E-PHICH in the subframes {2, 3, 4, 7, 8, 15, and 16}, and delivers the HARQ indicator indicating the ACK to the HARQ entity.

Instead of the information indicating the subframes to be reserved for the transmission of the HARQ indicator using the E-PHICH among the MBSFN subframes, the base station device 3 may transmit information indicating the subframes to be reserved for the transmission of the HARQ indicator using the E-PHICH among all subframes.

In this case, the mobile station device 1 receives the information indicating the subframes to be reserved for the transmission of the HARQ indicator using the E-PHICH, transmits the transport block by using the PUSCH to the base station device 3, and if a time in which the HARQ indicator for the transmission of the transport block is received by using the E-PHICH is the subframe indicated by the information, the mobile station device 1 receives the HARQ indicator for the transmission of the transport block by using the E-PHICH.

Further, the mobile station device 1 receives the information indicating the subframes to be reserved for the transmission of the HARQ indicator using the E-PHICH, transmits the transport block by using the PUSCH to the base station device 3, and if a time in which the HARQ indicator for the transmission of the transport block received by using the E-PHICH is the subframe excluding the subframes indicated by the information, when the HARQ indicator for the transmission of the transport block is received, the mobile station device 1 sets the state variable managed by the HARQ process corresponding to the transport block to ACK.

Figure 15:
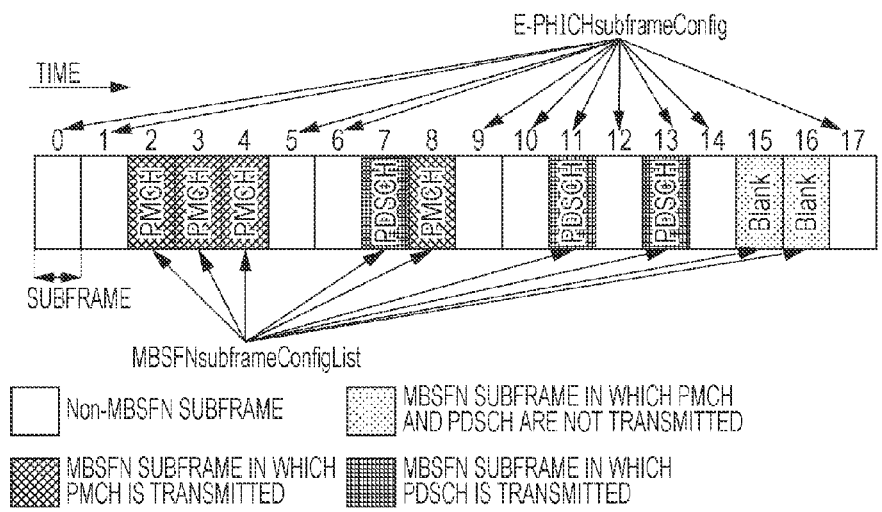
FIG. 15 is a diagram illustrating a subframe that is reserved for transmitting the HARQ indicator using the E-PHICH in the second embodiment of the present invention.

FIG. 15 is a diagram illustrating subframes that are reserved for the transmission of the HARQ indicator using the E-PHICH in the second embodiment of the present invention. In FIG. 15, the horizontal axis represents the time domain. In FIG. 15, the subframes {2, 3, 4, 7, 8, 11, 13, 15, and 16} are MBSFN subframes, and the remaining subframes are non-MBSFN subframes. In FIG. 15, the subframes {0, 1, 5, 6, 9, 10, 11, 12, 13, 14, and 17} are subframes that are reserved for the transmission of the HARQ indicator using the E-PHICH, and the subframes {2, 3, 4, 7, 8, 15, and 16} are subframes which are not reserved for the transmission of the HARQ indicator using the E-PHICH. In FIG. 14, among all subframes, information indicating the subframes to be reserved for the transmission of the HARQ indicator using the E-PHICH indicates subframes {0, 1, 5, 6, 9, 10, 11, 12, 13, 14, and 17}.

Thus, in the MBSFN subframes to be reserved for the transmission of the HARQ indicator using the E-PHICH, the base station device 3 and the mobile station device 1 may transmit and receive the HARQ indicator by using the E-PHICH.

Third Embodiment

Hereinafter, the third embodiment of the present invention will be described.

The base station device 3 receives MBMS data from the higher node. In addition, the base station device 3 receives an indication of the subframes for transmitting the PMCH, from the higher node. The base station device 3 reserves the subframes that are indicated for the transmission of the PMCH from the higher node, as the MBSFN subframes. However, there is a loss of MBMS data to be transmitted in the PMCH, in subframes that are indicated for the transmission of the PMCH from the higher node due to a failure of communication between the higher node and the base station device 3. The base station device 3 may reuse the MBSFN subframes for the transmission of the PDSCH.

In the second embodiment, the base station device 3 transmits the information for indicating subframes to be reserved for the transmission of HARQ indicator by using E-PHICH to the mobile station device 1. However, since the base station device 3 does not know when a loss of MBMS data occurs between the higher node and the base station device 3, the base station device 3 is not able to indicate the MBSFN subframes to be re-used for transmitting PDSCH by the information. Thus, in the second embodiment, there is a problem that the mobile station device 1 is not able to receive the E-PHICH in the MBSFN subframes which are reused.

Therefore, in the third embodiment, the mobile station device 1 performs a detection process of the mobile station device-specific reference signals transmitted with E-PHICH in the MBSFN subframe. In the third embodiment, when the mobile station device-specific reference signals are detected in the subframe in which the HARQ indicator for the transmission of the transport block is received using the E-PHICH, the mobile station device 1 receives the HARQ indicator for the transmission of the transport block using E-PHICH.

Further, in the third embodiment, when the mobile station device 1 does not detect the mobile station device-specific reference signal in the subframe in which the HARQ indicator for the transmission of the transport block is received using the E-PHICH, the mobile station device 1 sets the state variable that is managed by the HARQ process corresponding to the transport block to ACK when receiving the HARQ indicator for the transmission of the transport block.

Thus, the mobile station device 1 may receive the E-PHICH in the MBSFN subframe which is reused for transmitting PDSCH.

In addition, the base station device 3 may transmit the sequence that is used to indicate that there is E-PHICH and/or E-PDCCH that is different from the mobile station device-specific reference signal. The base station device 3 configures a resource for transmitting the sequence and transmits information indicating the configuration to the mobile station device 1. It is preferable that the resource for transmitting the sequence be the entirety or a portion of the resources that are used for transmitting the E-PHICH. Thus, the mobile station device 1 may immediately perform the reception process of the E-PHICH by using the resources of a band in which the sequence is detected. Further, the mobile station device 1 may perform the correction of the channel of E-PHICH by using the sequence.

Further, the base station device 3 may indicate the physical resource blocks which are reserved for E-PDCCH and E-PHICH by using the sequences. The mobile station device 1 may perform the reception process of the E-PDCCH and the E-PHICH in the entirety or a portion of the physical resource blocks indicated by the sequence. Thus, the base station device 3 may adaptively control the physical resource blocks used for transmitting the E-PHICH and the E-PDCCH. Further, the base station device 3 may transmit the sequence by using the physical channels (Enhanced-Physical Control Format Indicator Channel: E-PCFICH).

Fourth Embodiment

Hereinafter, a fourth embodiment of the present invention will be described.

In the fourth embodiment, the base station device 3 generates a sequence of HARQ indicators by associating the HARQ indicators with a plurality of mobile station devices 1. The base station device 3 generates a CRC code by using the sequence, and adds the CRC code to the sequence. The base station device 3 scrambles the added CRC code by using a HARQ RNTI. The base station device 3 codes and modulates the sequence to which the CRC code is added, and maps the sequence to the resource elements of the E-PHICH. The HARQ RNTI is RNTI used to detect the sequence of HARQ indicators. Further, the base station device 3 may configure the value of the HARQ RNTI.

In the fourth embodiment, in each of the subframes, the mobile station device 1 acquires the modulation symbols from the resource elements of the E-PHICH, and attempts to decode the sequence. Further, the mobile station device 1 generates a CRC code by using the decoded sequence, and scrambles the generated CRC code by using the value of the HARQ RNTI that has been set by the base station device 3. The mobile station device 1 compares the CRC code that the mobile station device 1 has generated, with the decoded CRC code.

If the CRC code that the mobile station device 1 has generated and the decoded CRC code match, the mobile station device 1 assumes the decoding of the sequence to be successful, acquires the HARQ indicator intended for the mobile station device 1 from the sequence, and delivers the acquired the HARQ indicator to the HARQ entity. If the CRC code that the mobile station device 1 has generated and the decoded CRC code do not match, the mobile station device 1 assumes the decoding of the sequence to have failed, and delivers ACK to the HARQ entity.

Thus, the mobile station device 1 may determine whether or not an E-PHICH has been correctly decoded in each subframe. Further, as a result, when the mobile station device 1 fails in the decoding of the E-PHICH that is transmitted by the base station device 3, or if a time in which the base station device 3 transmits the E-PHICH is the MBSFN subframe for transmitting PMCH and is not able to transmit the E-PHICH, the mobile station device 1 assumes the decoding of the sequence to have failed and delivers ACK to the HARQ entity, and thus it is possible to avoid retransmission of an incorrect transport block.

A device configuration of the present embodiment will be described.

Figure 16:
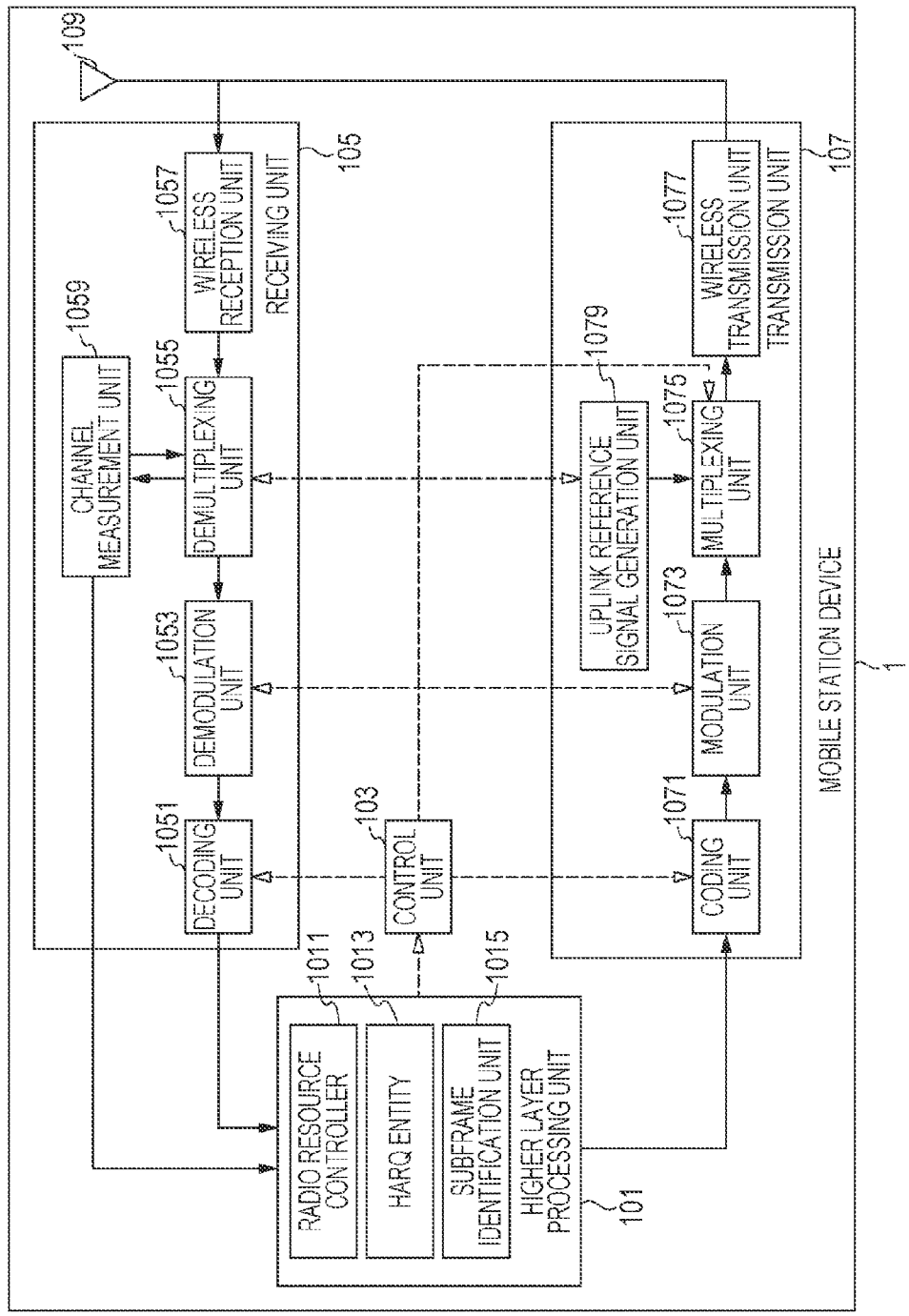
FIG. 16 is a schematic block diagram illustrating a configuration of a mobile station device 1 of the present embodiment.

FIG. 16 is a schematic block diagram illustrating a configuration of a mobile station device 1 of the present embodiment. As illustrated, the mobile station device 1 is configured to include a higher layer processing unit 101, a control unit 103, a receiving unit 105, a transmission unit 107, and a transmitting and receiving antenna 109. Further, the higher layer processing unit 101 is configured to include a radio resource control unit 1011, a HARQ entity 1013, and a subframe identification unit 1015. The receiving unit 105 is configured to include a decoding unit 1051, a demodulation unit 1053, a demultiplexing unit 1055, a wireless reception unit 1057, and a channel measurement unit 1059. Further, the transmission unit 107 is configured to include a coding unit 1071, a modulation unit 1073, a multiplexing unit 1075, a wireless transmission unit 1077, and an uplink reference signal generation unit 1079.

The higher layer processing unit 101 outputs the uplink data (transport block) generated by the operation and the like of a user to the transmission unit 107. Furthermore, the higher layer processing unit 101 processes a Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various pieces of configuration information of the mobile station device 1. For example, the radio resource control unit 1011 manages the configuration such as an RNTI and a physical channel. Further, the radio resource control unit 1011 generates information to be arranged in each uplink channel, and outputs the information to the transmission unit 107 and/or the HARQ entity.

The HARQ entity 1013 included in the higher layer processing unit 101 controls a plurality of HARQ processes. Further, each of the HARQ processes generates control information for controlling the receiving unit 105 and the transmission unit 107, based on the information used for scheduling the physical channels (such as PUSCH and PDSCH) received through the receiving unit 105, and outputs the generated control information to the control unit 103.

The subframe identification unit 1015 included in the higher layer processing unit 101 performs the identification of the subframe. For example, the subframe identification unit 1015 identifies the non-MBSFN subframe and the MBSFN subframe, based on MBSFNsubframeConfigList. For example, the subframe identification unit 1015 identifies the subframe that is reserved for the transmission of the HARQ indicator using the E-PHICH, based on E-PHICHsubframe-Config. For example, the subframe identification unit 1015 identifies the MBSFN subframes that are used in the transmission of the E-PHICH, the E-PDCCH, and the PDSCH, based on the detection of the mobile station device-specific reference signal. For example, the subframe identification unit 1015 identifies the MBSFN subframes that are used in the transmission of the E-PHICH, the E-PDCCH, and the PDSCH, based on the detection of the sequence that is transmitted by using the E-PCFICH. For example, the subframe identification unit 1015 identifies the MBSFN subframes that are used in the transmission of the E-PHICH, the E-PDCCH, and the PDSCH, based on the detection of the E-PHICH and/or the E-PDCCH using CRC.

The control unit 103 generates a control signal for controlling the receiving unit 105 and the transmission unit 107, based on the control information from the higher layer processing unit 101. The control unit 103 outputs the generated control signal to the receiving unit 105 and the transmission unit 107 so as to control the receiving unit 105 and the transmission unit 107.

The receiving unit 105 performs separation, demodulation, and decoding on the signal received from the base station device 3 through the transmitting and receiving antennas 109, according to the control signal that is input from the control unit 103, and outputs the decoded information to the higher layer processing unit 101.

The wireless reception unit 1057 converts (down-converts) the downlink signal received through the transmitting and receiving antenna 109 into a signal of an intermediate frequency, removes unnecessary frequency components, controls an amplification level so as to appropriately maintain the signal level, performs quadrature demodulation on the received signal, based on the in-phase and quadrature components thereof, and converts an analog signal subjected to the quadrature demodulation into a digital signal. The wireless reception unit 1057 removes a portion corresponding to a Guard Interval (GI) from the converted digital signal. The wireless reception unit 3057 performs Fast Fourier Transform (FFT) on the signal obtained by removing the guard interval so as to extract a signal of a frequency domain.

The demultiplexing unit 1055 respectively separates the extracted signal into PHICH, PDCCH, PDSCH, and the downlink reference signal. Further, the demultiplexing unit 1055 performs compensation of channels of PHICH, PDCCH, and PDSCH, from the estimated value of the channel which is input from the channel measurement unit 1059. Further, the demultiplexing unit 1055 outputs the separated downlink reference signal to the channel measurement unit 1059.

The demodulation unit 1053 multiplies the corresponding code by PHICH to combine a signal, performs demodulation of a Binary Phase Shift Keying (BPSK) modulation scheme on the combined signal, and outputs the decoded signal to the decoding unit 1051. The decoding unit 1051 decodes the PHICH addressed to the mobile station device, and outputs the decoded HARQ indicator to the higher layer processing unit 101. The demodulation unit 1053 performs demodulation of a QPSK modulation scheme on PDCCH, and outputs decoded PDCCH to the decoding unit 1051. The decoding unit 1051 attempts to perform blind decoding of PDCCH, and if the blind decoding is successful, the decoding unit 1051 outputs RNTI that is included in the downlink control information that has been decoded and outputs the downlink control information to the higher layer processing unit 101.

The demodulation unit 1053 performs demodulation of a modulation scheme which is notified in the downlink assignment, such as Quadrature Phase Shift Keying (QPSK), 16 Quadrature Amplitude Modulation (QAM), and 64 QAM, on the PDSCH, and outputs demodulated signal to the decoding unit 1051. The decoding unit 1051 performs decoding based on information regarding a coding rate which is notified in downlink control information, and outputs the decoded downlink data (transport block) to the higher layer processing unit 101.

The channel measurement unit 1059 measures a path loss of downlink from the downlink reference signal which is input from the demultiplexing unit 1055, and outputs the measured path loss to the higher layer processing unit 101. Further, the channel measurement unit 1059 calculates the channel state information from the downlink reference signal which is input from the demultiplexing unit 1055, and outputs the calculated channel state information to the higher layer processing unit 101. Further, the channel measurement unit 1059 calculates an estimation value of a channel of the downlink from the downlink reference signal, and outputs the calculated estimation value to the demultiplexing unit 1055.

The transmission unit 107 generates an uplink reference signal according to the control signal input from the control unit 103, codes and modulates the uplink data (transport block) which is input from the higher layer processing unit 101, multiplexes the PUCCH, the PUSCH, and the generated uplink reference signal, and transmits the multiplexed signals to the base station device 3 through the transmitting and receiving antenna 109.

The coding unit 1071 performs coding such as convolutional coding and block coding on the uplink control information which is input from the higher layer processing unit 101. Further, the coding unit 1071 performs a turbo coding based on the information used for the scheduling of PUSCH.

The modulation unit 1073 modulates the coded bits which are input from the coding unit 1071 by a modulation scheme notified by the downlink control information or a predetermined modulation scheme for each channel, such as BPSK, QPSK, 16QAM, and 64QAM.

The uplink reference signal generation unit 1079 generates a sequence obtained by a predetermined rule, based on a physical layer cell identity (also referred to as PCI, a Cell ID and the like) for identifying the base station device 3, a bandwidth for arranging the uplink reference signal, a cyclic shift which has been notified by the uplink grant, and a value or the like of the parameter for the generation of the DMRS sequence.

The multiplexing unit 1075 rearranges the modulation symbols of PUSCH in parallel and performs Discrete Fourier Transform (DFT) on the modulation symbols, according to the control signal input from the control unit 103. Further, the multiplexing unit 1075 multiplexes the signals of the PUCCH and the PUSCH and the generated uplink reference signal for each transmit antenna port. In other words, the multiplexing unit 1075 arranges the signals of PUCCH and PUSCH and the generated uplink reference signal in the resource element for each transmit antenna port.

The wireless transmission unit 1077 performs Inverse Fast Fourier Transform (IFFT) and performs modulation of a SC-FDMA scheme on the multiplexed signals, adds a guard interval to the SC-FDMA symbols which have been subjected to the SC-FDMA modulation to generate a digital baseband signal, converts the digital baseband signal into an analog signal to generate the in-phase and quadrature components of an intermediate frequency from the analog signal, removes extra frequency components for an intermediate frequency band, converts (up-converts) the intermediate frequency signals into high frequency signals, removes extra frequency components, amplifies the power, and outputs the amplified signals to the transmitting and receiving antenna 109 for transmission.

Figure 17:
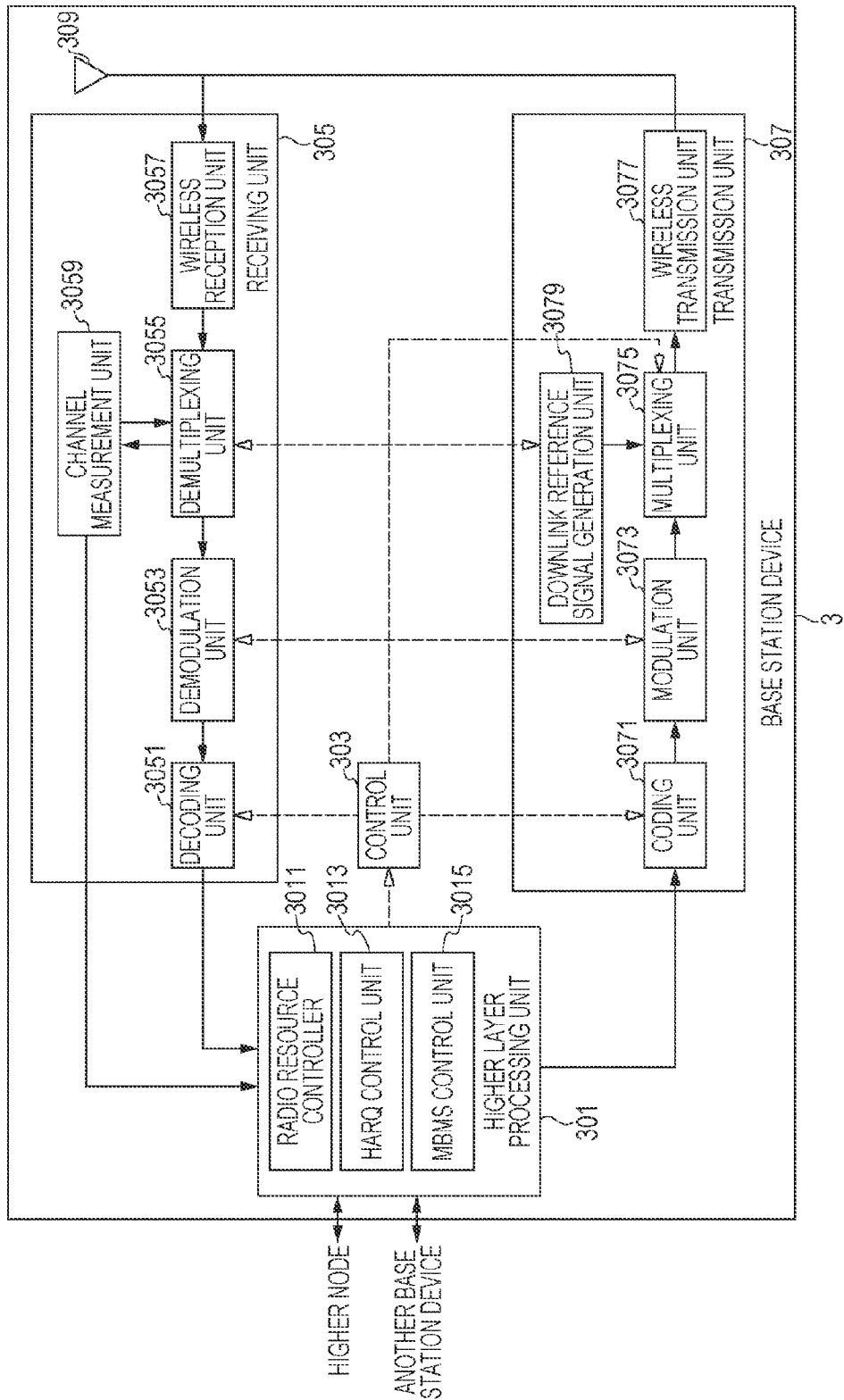
FIG. 17 is a schematic block diagram illustrating a configuration of a base station device 3 of the present embodiment.

FIG. 17 is a schematic block diagram illustrating a configuration of a base station device 3 of the present embodiment. As illustrated, the base station device 3 is configured to include an higher layer processing unit 301, a control unit 303, a receiving unit 305, a transmission unit 307, and a transmitting and receiving antenna 309. Further, the higher layer processing unit 301 is configured to include a radio resource control unit 3011, a HARQ control unit 3013, and an MBMS control unit 3015. Further, the receiving unit 305 is configured to include a decoding unit 3051, a demodulation unit 3053, a demultiplexing unit 3055, a wireless reception unit 3057, and a channel measurement unit 3059. Further, the transmission unit 307 is configured to include a coding unit 3071, a modulation unit 3073, a multiplexing unit 3075, a wireless transmission unit 3077, and a downlink reference signal generation unit 3079.

The higher layer processing unit 301 processes a Medium Access Control (MAC) layer, a Packet Data Convergence Protocol (PDCP) layer, a Radio Link Control (RLC) layer, and a Radio Resource Control (RRC) layer. Further, the higher layer processing unit 301 generates control information for controlling the receiving unit 305 and the transmission unit 307, and outputs the control information to the control unit 303.

A radio resource control unit 3011 included in the higher layer processing unit 301 generates downlink data arranged in the PDSCH of the downlink (transport block), RRC signaling, and MAC Control Element (CE), or acquires them from the higher node, and outputs them to the transmission unit 307. Further, the radio resource control unit 3011 manages various pieces of configuration information of respective mobile station devices 1. For example, the radio resource control unit 3011 manages the configuration of the RNTI and the physical channels.

The HARQ control unit 3013 included in the higher layer processing unit 301 controls the HARQ. For example, the HARQ control unit 3013 stores a signal of the transport block in which the decoding has failed, in the buffer. Further, HARQ control unit 3013 outputs the downlink control information for indicating the retransmission of the transport block in which the decoding has failed and/or NACK, to the transmission unit 307. Further, the HARQ control unit 3013 outputs signals of the transport blocks that are stored in the buffer to the decoding unit 3051 through the control unit 303. The decoding unit 3051 decodes the transport block by using the signal of the transport block that is input from the HARQ control unit 3013 and the signal of the transport block that is input from the demodulation unit 3053.

The MBMS control unit 3015 determines the subframe to be reserved for the MBSFN according to the input signal from the higher node. In addition, the MBMS control unit 3015 determines the MBSFN subframe to be re-used for the PDSCH. In addition, the MBMS control unit 3015 determines the MBSFN subframe to be reserved for the PDSCH. The MBMS control unit 3015 outputs the type of the determined subframe to the radio resource control unit 3011 and the HARQ control unit 3013.

The control unit 303 generates a control signal for controlling the receiving unit 305 and the transmission unit 307, based on the control information from the higher layer processing unit 301. The control unit 303 outputs the generated control signal to the receiving unit 305 and the transmission unit 307 and controls the receiving unit 305 and the transmission unit 307.

The receiving unit 305 performs separation, demodulation, and decoding on the reception signal received from the mobile station device 1 through the transmitting and receiving antennas 309, according to the control signal that is input from the control unit 303, and outputs the decoded information to the higher layer processing unit 301. The wireless reception unit 3057 converts (down-converts) the uplink signal received through the transmitting and receiving antenna 309 into a signal of an intermediate frequency, removes unnecessary frequency components, controls an amplification level so as to appropriately maintain the signal level, performs quadrature demodulation on the received signal, based on the in-phase and quadrature components thereof, and converts an analog signal subjected to the quadrature demodulation into a digital signal.

The wireless reception unit 3057 removes a portion corresponding to Guard Interval (GI) from the converted digital signal. The wireless reception unit 3057 performs Fast Fourier Transform (FFT) on the signal obtained by removing the guard interval so as to extract and output a signal of a frequency domain to the demultiplexing unit 3055.

The demultiplexing unit 1055 separates the signal input from the wireless reception unit 3057 into PUCCH, PUSCH, the uplink reference signal, and the like. Further, the separation is performed based on the radio resource assignment information contained in the uplink grant that the base station device 3 has determined in advance in the radio resource control unit 3011 and notified to each mobile station device 1. Further, the demultiplexing unit 3055 performs compensation of channels of PUCCH and PUSCH, from the estimated value of the channel which is input from the channel measurement unit 3059. Further, the demultiplexing unit 3055 outputs the separated uplink reference signal to the channel measurement unit 3059.

The demodulation unit 3053 acquires modulation symbols by performing Inverse Discrete Fourier Transform (IDFT) on the PUSCH, and demodulates each modulation symbol of PUCCH and PUSCH in the received signal by using a modulation scheme such as Binary Phase Shift Keying (BPSK), QPSK, 16QAM, and 64QAM, that is predetermined or that the base station device 3 has notified in advance to each the mobile station device 1 by the uplink grant.

The decoding unit 3051 decodes the coded bits of the demodulated PUCCH and PUSCH at a coding rate that is predetermined or that the base station device 3 has notified in advance to each the mobile station device 1 by the uplink grant, by using the predetermined coding scheme, and outputs the decoded uplink data and the uplink control information to the higher layer processing unit 101. When the PUSCH is retransmitted, the decoding unit 3051 performs decoding by using the coded bits that are input from the higher layer processing unit 301 and stored in the HARQ buffer, and the demodulated coded bits. The channel measurement unit 309 measures the estimated value of the channel, the quality of the channel and the like from the uplink reference signal that is input from the demultiplexing unit 3055, and outputs the measured value to the demultiplexing unit 3055 and the higher layer processing unit 301.

The transmission unit 307 generates a downlink reference signal according to a control signal that is input from the control unit 303, codes and modulates the HARQ indicator, the downlink control information, and the downlink data that are input from the higher layer processing unit 301, multiplexes the PHICH, the PDCCH, the PDSCH, and the downlink reference signal, and transmits the signals to the mobile station device 1 through the transmitting and receiving antenna 309.

The coding unit 3071 performs coding by using a predetermined coding scheme such as block coding, convolutional coding, and turbo coding or performs coding by using the coding scheme that is determined by the radio resource control unit 3011 on the HARQ indicator, the downlink control information, and the downlink data that are input from the higher layer processing unit 301. The modulation unit 3073 modulates the coded bits which are input from the coding unit 3071 by a modulation scheme such as BPSK, QPSK, 16QAM, and 64QAM, that is predetermined, or determined by the radio resource control unit 3011.

The downlink reference signal generation unit 3079 generates a sequence that is known by the mobile station device 1 and is determined by a predetermined rule based on the physical layer cell identifier (PCI) for identifying the base station device 3, and the like, as the downlink reference signal. The multiplexing unit 3075 multiplexes the modulation symbols for each modulated channel and the generated downlink reference signal. In other words, the multiplexing unit 3075 arranges the modulation symbols for each modulated channel and the generated downlink reference signal in the resource element.

The wireless transmission unit 3077 performs Inverse Fast Fourier Transform (IFFT) and performs modulation of a OFDM scheme on the multiplexed modulation symbols or the like, adds a guard interval to the OFDM symbols which have been subjected to the OFDM modulation to generate a digital baseband signal, converts the digital baseband signal into an analog signal to generate the in-phase and quadrature components of an intermediate frequency from the analog signal, removes extra frequency components for an intermediate frequency band, converts (up-converts) the intermediate frequency signals into high frequency signals, removes extra frequency components, amplifies the power, and outputs the amplified signals to the transmitting and receiving antenna 309 for transmission.

The programs operating in the base station device 3 and the mobile station device 1 according to the present invention may be programs for controlling a Central Processing Unit (CPU) (programs for causing a computer to function) so as to realize the functions of the above embodiments according to the present invention. Then, information handled by these devices is temporarily stored in a Random Access Memory (RAM) during the process, and thereafter, is stored in various ROMs such as a Flash Read Only Memory (ROM) or a Hard Disk Drive (HDD), and is read by the CPU as necessary for performing modification and writing.

Further, the computer may implement a portion of the mobile station device 1 and the base station device 3 in the embodiments described above. In this case, a program for implementing the control function may be recorded on a computer readable recording medium, and the program that is recorded in the recording medium may be realized by causing a computer system to read and execute the program.

Further, it is assumed that the term "computer system" herein is a computer system that is incorporated into the mobile station device 1 or the base station device 3 and includes an OS and hardware such as peripheral devices. Further, the "computer-readable recording medium" means a portable medium such as a flexible disk, a magneto-optical disk, a ROM, a CD-ROM, or a storage device such as a hard disk built in the computer system.

Further, the "computer-readable recording medium" may include those that store a program dynamically during a short time, such as communication lines in which the program is transmitted through a network such as the Internet or a communication line such as a telephone line, and those that store the program for a certain period of time, such as a volatile memory in the computer system which is a server and a client in this case. Further, the program may be a program for implementing a portion of the above functions or a program for implementing the functions described above in conjunction with programs already recorded on the computer system.

Further, the entirety or a portion of the mobile station device 1 and the base station device 3 in the above described embodiment may be typically implemented as an LSI which is an integrated circuit, or may be implemented as a chipset. The respective functional blocks of the mobile station device 1 and the base station device 3 may be formed into respective chips, or the entirety or a portion thereof may be integrated and formed into a chip. Further, a circuit integration technology is not limited to an LSI, and may be implemented as a dedicated circuit, or in a general purpose processor. Further, when the circuit integration technology that replaces the LSI appears with the advance of a semiconductor technology, it is possible to use an integrated circuit according to the technology.

(1) In order to achieve the object, the present invention takes measures as described below. In other words, a mobile station device of the present invention is a mobile station device that communicates with a base station device by using a Multicast/Broadcast over Single Frequency Network (MBSFN) subframe and a non-MBSFN subframe, in which the mobile station device transmits a transport block to the base station device by using a Physical Uplink Shared Channel, and if a time in which a HARQ feedback for transmission of the transport block is received by using an enhanced physical HARQ indicator channel is the MBSFN subframe, when the HARQ feedback for the transmission of the transport block is received, the mobile station device sets a state variable managed by a HARQ process corresponding to the transport block to acknowledgement (ACK).

(2) Further, a mobile station device of the present invention is a mobile station device that communicates with a base station device by using a Multicast/Broadcast over Single Frequency Network (MBSFN) subframe and a non-MBSFN subframe, in which the mobile station device transmits a transport block to the base station device by using the Physical Uplink Shared Channel, and if a time in which a HARQ feedback for transmission of the transport block is received by using an enhanced physical HARQ indicator channel is a specific MBSFN subframe, when the HARQ feedback for the transmission of the transport block is received, the mobile station device 1 sets a state variable managed by a HARQ process corresponding to the transport block to acknowledgement (ACK).

(3) Furthermore, in the present invention, the mobile station device receives information indicating a subframe to be reserved for the transmission of the HARQ feedback using the enhanced physical HARQ indicator channel, among the MBSFN subframes. Further, the specific MBSFN subframe is a subframe indicated by the information.

(4) Further, in the present invention, in the mobile station device, the specific MBSFN subframe is a subframe in which the mobile station device does not detect the mobile station device-specific reference signal.

(5) Further, in the present invention, the mobile station device receives information indicating the subframe to be reserved as the MBSFN subframes.

(6) Furthermore, a mobile station device of the present invention is a mobile station device that receives a HARQ feedback for transmission of a transport block from the base station device by using either or both of a physical HARQ indicator channel and an enhanced physical HARQ indicator channel, in which the mobile station device receives information indicating a subframe to be reserved for transmitting a HARQ feedback using the enhanced physical HARQ indicator channel, transmits the transport block to the mobile station device by using a physical uplink shared channel, and if a time in which the HARQ feedback for the transmission of the transport block is received by using the enhanced physical HARQ indicator channel is a subframe excluding the subframe indicated by the information, when the HARQ feedback for the transmission of the transport block is received, the mobile station device sets a state variable managed by a HARQ process corresponding to the transport block to acknowledgement (ACK).

(7) Further, a mobile station device of the present invention is a mobile station device that receives a HARQ feedback for transmission of a transport block by using either or both of the physical HARQ indicator channel and the enhanced physical HARQ indicator channel from the base station device, in which the mobile station device transmits the transport block by using a physical uplink shared channel to the base station device, attempts to detect the enhanced physical HARQ indicator channel by using an identifier corresponding to the enhanced physical HARQ indicator channel, and when the enhanced physical HARQ indicator channel used for transmitting the HARQ feedback for the transmission of the transport block is detected, sets a state variable managed by a HARQ process corresponding to the transport block to acknowledgement (ACK) or negative-acknowledgement (NACK) that is indicated by the HARQ feedback received by using the enhanced physical HARQ indicator channel, and when the enhanced physical HARQ indicator channel used for transmitting the HARQ feedback for the transmission of the transport block is not detected, sets the state variable managed by the HARQ process corresponding to the transport block to acknowledgement (ACK).

(8) Further, in the present invention, the mobile station device receives information indicating whether or not it is necessary to receive the HARQ feedback for the transmission of the transport block by using the enhanced physical HARQ indicator channel.

(9) Further, in the present invention, the mobile station device receives control information used for scheduling the physical uplink control channel by using a physical downlink control channel from the base station device, and sets the state variable in which ACK or NACK has been set to NACK, when the HARQ process performs initial transmission or adaptive retransmission based on the control information.

(10) Further, in the present invention, the mobile station device receives the HARQ feedback for the transmission of the transport block by using the enhanced physical HARQ indicator channel, in the fourth subframe from the subframe in which the transport block was transmitted.

(11) Further, a wireless communication method of the present invention is a wireless communication method used in a mobile station device that communicates with a base station device by using a Multicast/Broadcast over Single Frequency Network (MBSFN) subframe and a non-MBSFN subframe, in which a transport block is transmitted to the base station device by using the Physical Uplink Shared Channel, and if a time in which a HARQ feedback for transmission of the transport block is received by using an enhanced physical HARQ indicator channel is the MBSFN subframe, when the HARQ feedback for the transmission of the transport block is received, a state variable managed by a HARQ process corresponding to the transport block is set to acknowledgement (ACK).

(12) Further, a wireless communication method of the present invention is a wireless communication method used in a mobile station device that communicates with a base station device by using a Multicast/Broadcast over Single Frequency Network (MBSFN) subframe and a non-MBSFN subframe, a transport block is transmitted to the base station device by using the Physical Uplink Shared Channel, and if a time in which a HARQ feedback for the transmission of the transport block is received by using an enhanced physical HARQ indicator channel is a specific MBSFN subframe, when the HARQ feedback for the transmission of the transport block is received, the state variable managed by the HARQ process corresponding to the transport block is set to acknowledgement (ACK).

(13) Further, a wireless communication method of the present invention is a wireless communication method used in a mobile station device that receives a HARQ feedback for transmission of a transport block from a base station device by using either or both of a physical HARQ indicator channel and an enhanced physical HARQ indicator channel, in which information indicating a subframe to be reserved for the transmission of the HARQ feedback using the enhanced physical HARQ indicator channel is received, the transport block is transmitted to the base station device by using a physical uplink shared channel, and if a time in which the HARQ feedback for the transmission of the transport block is received by using the enhanced physical HARQ indicator channel is a subframe excluding the subframe indicated by the information, when the HARQ feedback for the transmission of the transport block is received, the state variable managed by the HARQ process corresponding to the transport block is set to acknowledgement (ACK).

(14) Further, a wireless communication method of the present invention is a wireless communication method used in a mobile station device that receives a HARQ feedback for transmission of a transport block by using either or both of a physical HARQ indicator channel and an enhanced physical HARQ indicator channel from a base station device, in which the transport block is transmitted by using a physical uplink shared channel to the base station device, detection of the enhanced physical HARQ indicator channel is attempted by using an identifier corresponding to the enhanced physical HARQ indicator channel, and when the enhanced physical HARQ indicator channel used for transmitting the HARQ feedback for the transmission of the transport block is detected, a state variable managed by a HARQ process corresponding to the transport block is set to acknowledgement (NACK) or negative-acknowledgement (NACK) that is indicated by the HARQ feedback received by using the enhanced physical HARQ indicator channel is configured, and when the enhanced physical HARQ indicator channel used for transmitting the HARQ feedback for the transmission of the transport block is not detected, the state variable managed by the HARQ process corresponding to the transport block is set to ACK.

(15) Further, the integrated circuit of the present invention is an integrated circuit which causes a mobile station device to exhibit a plurality of functions by being mounted on the mobile station device that communicates with a base station device by using a Multicast/Broadcast over Single Frequency Network (MBSFN) subframe and a non-MBSFN subframe, in which the integrated circuit causes the mobile station device to exhibit a function of transmitting a transport block to the base station device by using the Physical Uplink Shared Channel, and if a time in which a HARQ feedback for the transmission of the transport block is received by using an enhanced physical HARQ indicator channel is the MBSFN subframe, when the HARQ feedback for the transmission of the transport block is received, a function of setting a state variable managed by a HARQ process corresponding to the transport block to acknowledgement (ACK).

(16) Further, an integrated circuit of the present invention is an integrated circuit which causes a mobile station device to exhibit a plurality of functions by being mounted on the mobile station device that communicates with a base station device by using a Multicast/Broadcast over Single Frequency Network (MBSFN) subframe and a non-MBSFN subframe. The integrated circuit causes the mobile station device to exhibit a function of transmitting a transport block to the base station device by using the Physical Uplink Shared Channel, and if a time in which a HARQ feedback for the transmission of the transport block is received by using an enhanced physical HARQ indicator channel is a specific MBSFN subframe, when the HARQ feedback for the transmission of the transport block is received, a function of setting the state variable managed by the HARQ process corresponding to the transport block to acknowledgement (ACK).

(17) Further, an integrated circuit of the present invention is an integrated circuit which causes a mobile station device to exhibit a plurality of functions by being mounted on a mobile station device that receives a HARQ feedback for transmission of a transport block by using either or both of a physical HARQ indicator channel and an enhanced physical HARQ indicator channel. The integrated circuit causes the mobile station device to exhibit a function of receiving information indicating a subframe to be reserved for transmitting a HARQ feedback using the enhanced physical HARQ indicator channel, a function of transmitting the transport block to the base station device by using a physical uplink shared channel, and, if a time in which the HARQ feedback for the transmission of the transport block is received by using the enhanced physical HARQ indicator channel is a subframe excluding the subframe indicated by the information, when the HARQ feedback for the transmission of the transport block is received, a function of setting a state variable managed by a HARQ process corresponding to the transport block to acknowledgement (ACK).

(18) Further, an integrated circuit of the present invention is an integrated circuit which causes a mobile station device to exhibit a plurality of functions by being mounted on the mobile station device that receives a HARQ feedback for transmission of a transport block by using either or both of a physical HARQ indicator channel and an enhanced physical HARQ indicator channel from a base station device. The integrated circuit causes the mobile station device to exhibit a function of transmitting the transport block by using a physical uplink shared channel to the base station device, a function of attempting detection of the enhanced physical HARQ indicator channel by using an identifier corresponding to the enhanced physical HARQ indicator channel, a function of setting a state variable managed by a HARQ process corresponding to the transport block to acknowledgement (ACK) or negative-acknowledgement (NACK) that is indicated by the HARQ feedback received by using the enhanced physical HARQ indicator channel when the enhanced physical HARQ indicator channel used for transmitting the HARQ feedback for the transmission of the transport block is detected, and a function of setting the state variable managed by the HARQ process corresponding to the transport block to ACK, when the enhanced physical HARQ indicator channel used for transmitting the HARQ feedback for the transmission of the transport block is not detected.

(19) Further, a base station device of the present invention is a base station device that communicates with a mobile station device by using a Multicast/Broadcast over Single Frequency Network (MBSFN) subframe and a non-MBSFN subframe, and transmits a HARQ feedback for transmission of a transport block to the mobile station device by using either or both of a physical HARQ indicator channel and an enhanced physical HARQ indicator channel. The base station device transmits information indicating a subframe to be reserved for transmitting a HARQ feedback using the enhanced physical HARQ indicator channel, among the MBSFN subframes.

(20) Further, in the present invention, the base station device transmits the information indicating a subframe to be reserved as the MBSFN subframe, to the mobile station device.

(21) Further, a base station device of the present invention is a base station device that transmits a HARQ feedback for transmission of a transport block to a mobile station device by using either or both of a physical HARQ indicator channel and an enhanced physical HARQ indicator channel. The base station device transmits information indicating a subframe to be reserved for transmitting a HARQ feedback using the enhanced physical HARQ indicator channel, to the mobile station device.

(22) Further, in the present invention, the base station device transmits information indicating whether or not it is necessary to receive the HARQ feedback for the transmission of the transport block by using the enhanced physical HARQ indicator channel, to the mobile station device.

(23) Further, in the present invention, the base station device transmits the HARQ feedback for the transmission of the transport block to the mobile station device by using the enhanced physical HARQ indicator channel, in the fourth subframe from the subframe in which the transport block has been received.

(24) Further, a wireless communication method of the present invention is a wireless communication method used in a base station device that communicates with a mobile station device by using a Multicast/Broadcast over Single Frequency Network (MBSFN) subframe and a non-MBSFN subframe, and transmits a HARQ feedback for transmission of a transport block to the mobile station device by using either or both of a physical HARQ indicator channel and an enhanced physical HARQ indicator channel, in which information indicating a subframe to be reserved for transmitting a HARQ feedback using the enhanced physical HARQ indicator channel, among the MBSFN subframes is transmitted.

(25) Further, a wireless communication method of the present invention is a wireless communication method used in a base station device that transmits a HARQ feedback for transmission of a transport block to the mobile station device by using either or both of a physical HARQ indicator channel and an enhanced physical HARQ indicator channel, in which information indicating a subframe to be reserved for transmitting a HARQ feedback using the enhanced physical HARQ indicator channel is transmitted to the mobile station device.

(26) Further, an integrated circuit of the present invention is an integrated circuit which causes a base station device to exhibit functions by being mounted on the base station device that communicates with a mobile station device by using a Multicast/Broadcast over Single Frequency Network (MBSFN) subframe and a non-MBSFN subframe, and transmits a HARQ feedback for transmission of a transport block to the mobile station device by using either or both of a physical HARQ indicator channel and an enhanced physical HARQ indicator channel. The integrated circuit causes the base station device to exhibit a function of transmitting information indicating a subframe to be reserved for transmitting a HARQ feedback using the enhanced physical HARQ indicator channel, among the MBSFN subframes.

(27) Further, an integrated circuit of the present invention is an integrated circuit which causes a base station device to exhibit functions by being mounted on the base station device that transmits a HARQ feedback for transmission of a transport block to the mobile station device by using either or both of a physical HARQ indicator channel and an enhanced physical HARQ indicator channel. The integrated circuit causes the base station device to exhibit a function of transmitting information indicating a subframe to be reserved for transmitting a HARQ feedback using the enhanced physical HARQ indicator channel, to the mobile station device.

Although an embodiment of the present invention has been described in detail with reference to the drawings in the above description, a specific configuration is not limited to the above description, and various design modifications are possible in a scope without departing from the spirit of the present invention.

REFERENCE SIGNS LIST 1 (1A, 1B, 1C) MOBILE STATION DEVICE
3 BASE STATION DEVICE
101 HIGHER LAYER PROCESSING UNIT
103 CONTROL UNIT
105 RECEIVING UNIT
107 TRANSMISSION UNIT
301 HIGHER LAYER PROCESSING UNIT
303 CONTROL UNIT
305 RECEIVING UNIT
307 TRANSMISSION UNIT
1011 RADIO RESOURCE CONTROL UNIT
1013 HARQ ENTITY
1015 SUBFRAME IDENTIFICATION UNIT
3011 RADIO RESOURCE CONTROL UNIT
3013 HARQ CONTROL UNIT
3015 MBMS CONTROL UNIT

The invention claimed is:

1. A base station apparatus which is configured to communicate with a mobile station apparatus, comprising:
a transmission unit configured to transmit first information indicating MBSFN (Multicast/Broadcast over Single Frequency Network) subframes as a subset of downlink subframes and second information indicating subframes for transmission of a downlink physical channel used for carrying control information associated with HARQ (Hybrid Automatic Repeat reQuest), the downlink physical channel being associated with a reference signal other than a cell-specific reference signal, wherein
the transmission unit is configured to transmit the downlink physical channels in the subframes indicated by the second information,
the second information indicates whether each of the MBSFN subframes indicated by the first information is a subframe for the transmission of the downlink physical channel or not.

2. A mobile station apparatus which is configured to communicate with a base station apparatus, comprising:
a reception unit configured to receive first information indicating MBSFN (Multicast/Broadcast over Single Frequency Network) subframes as a subset of downlink subframes and second information indicating subframes for transmission of a downlink physical channel used for carrying control information associated with HARQ (Hybrid Automatic Repeat reQuest), the downlink physical channel being associated with a reference signal other than a cell-specific reference signal, wherein
the reception unit is configured to perform a reception process of the downlink physical channels in the subframes indicated by the second information,
the second information indicates whether each of the MBSFN subframes indicated by the first information is a subframe for the transmission of the downlink physical channel or not.

3. A wireless communication method used in a base station apparatus which is configured to communicate with a mobile station apparatus, comprising:
transmitting first information indicating MBSFN (Multicast/Broadcast over Single Frequency Network) subframes as a subset of downlink subframes and second information indicating subframes for transmission of a downlink physical channel used for carrying control information associated with HARQ (Hybrid Automatic Repeat reQuest), the downlink physical channel being associated with a reference signal other than a cell-specific reference signal,
transmitting the downlink physical channels in the subframes indicated by the second information, wherein
the second information indicates whether each of the MBSFN subframes indicated by the first information is a subframe for the transmission of the downlink physical channel or not.

4. A wireless communication method used in a mobile station apparatus which is configured to communicate with a base station apparatus, comprising:
receiving first information indicating MBSFN (Multicast/Broadcast over Single Frequency Network) subframes as a subset of downlink subframes and second information indicating subframes for transmission of a downlink physical channel used for carrying control information associated with HARQ (Hybrid Automatic Repeat reQuest), the downlink physical channel being associated with a reference signal other than a cell-specific reference signal,
performing a reception process of the downlink physical channels in the subframes indicated by the second information, wherein
the second information indicates whether each of the MBSFN subframes indicated by the first information is a subframe for the transmission of the downlink physical channel or not.

* * * * *